US012754338B2

(12) United States Patent
Mizuno et al.

(10) Patent No.: US 12,754,338 B2
(45) Date of Patent: Oct. 6, 2026

(54) GEOLOGIC VELOCITY MODELING FRAMEWORK

(71) Applicant: Schlumberger Technology Corporation, Sugar Land, TX (US)

(72) Inventors: Takashi Mizuno, Sugar Land, TX (US); Joel Le Calvez, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 401 days.

(21) Appl. No.: 18/294,868

(22) PCT Filed: Aug. 4, 2022

(86) PCT No.: PCT/US2022/074508
§ 371 (c)(1),
(2) Date: Feb. 2, 2024

(87) PCT Pub. No.: WO2023/015235
PCT Pub. Date: Feb. 9, 2023

(65) Prior Publication Data

US 2024/0337768 A1 Oct. 10, 2024

Related U.S. Application Data

(60) Provisional application No. 63/229,139, filed on Aug. 4, 2021.

(51) Int. Cl.

| | |
|---|---|
| ***G01V 1/50*** | (2006.01) |
| ***E21B 47/04*** | (2012.01) |
| ***E21B 47/18*** | (2012.01) |

(52) U.S. Cl.
CPC ................ *G01V 1/50* (2013.01); *E21B 47/04* (2013.01); *E21B 47/18* (2013.01); *G01V 2210/6222* (2013.01)

(58) Field of Classification Search
CPC ........ E21B 47/04; E21B 47/18; E21B 47/107; G01V 1/50; G01V 2210/646;
(Continued)

(56) References Cited

U.S. PATENT DOCUMENTS 11,215,722 B2 * 1/2022 Le Calvez ............ G01V 1/282
11,781,424 B2 * 10/2023 Merry ..................... E21B 47/14
166/250.01

(Continued)

FOREIGN PATENT DOCUMENTS

CN 110529087 A 12/2019
WO 2016123014 A1 8/2016

OTHER PUBLICATIONS

Aki, K. et al. "Determination of Three-dimensional Velocity Anomalies Under a Seismic Array Using First P Arrival Times from Local Earthquakes, 1. A Homogenous Initial Model", Journal Of Geophysical Research, 1976, 81(23), pp. 4381-4399.

(Continued)

*Primary Examiner* — An H Do
(74) *Attorney, Agent, or Firm* — Kyle R. Miiller

(57) ABSTRACT

A method can include receiving a sonic data log for a length interval of a borehole in a geologic environment as acquired via a tool disposed in the borehole; representing the sonic data log using an ordered series representation with respect to length for at least a portion of the length interval; and inverting the sonic data log using the ordered series representation to generate a model of at least a portion of the geologic environment, where the model includes sonic velocity related property values.

17 Claims, 25 Drawing Sheets

(58) Field of Classification Search
CPC ... G01V 2210/6169; G01V 2210/6222; G01V 2210/616; G01V 2210/614; G01V 2210/43; G01V 2210/65; G01V 2210/6167
See application file for complete search history.

(56) References Cited

U.S. PATENT DOCUMENTS

| | | | | |
|---|---|---|---|---|
| 12,259,512 | B2 * | 3/2025 | Geerits .................. | G01V 1/306 |
| 2008/0151691 | A1 | 6/2008 | Eisner | |
| 2009/0145600 | A1 | 6/2009 | Wu | |
| 2011/0218737 | A1 | 9/2011 | Gulati | |
| 2015/0218930 | A1 | 8/2015 | Zeroug | |

OTHER PUBLICATIONS

Block, L. V. et al., “Seismic imaging using micro earthquakes induced by hydraulic fracturing” Geophysics, 1994, 59 (1), pp. 102-112.
Bui, T. et al. “Anisotropy Assessment of Dipole Sonic Log Data through Dispersion Analysis”, American Geophysical Union, Fall Meeting 2017, Dec. 2017, pp. 1-4.
Le Calvez, J.. et al. “Tool and Velocity Model Calibration for Downhole-Based Hydraulic Fracture Monitoring of Induced Microseismicity”, Society of Exploration Geophysicists Annual Meeting, 2013, 3 pages.
Chiao, L.-Y. et al. “Multiscale seismic tomography” Geophysical Journal International, 145, 2001, pp. 517-527.
Geiger, L. et al. “Probability Method for the Determination of Earthquake Epicenters from the Arrival Time 0nly”, Bulletin St. Louis University 8, 1910, pp. 60-67, (1912 translated in English by F.W.L. Peebles, A.H. Corey).
Grechka, V. et al. “Azimuthal anisotropy in microseismic monitoring: A Bakken case study” Geophysics, 79(1), pp. KS1-KS12.
Li, J. et al. “Microseismic joint location and anisotropic velocity inversion for hydraulic fracturing in a tight Bakken reservoir”, Society of Exploration Geophysicists, 2014, 79, 14 pages.
Mizuno, T. et al. “Anisotropic Velocity Model Inversion for Imaging the Microseismic Cloud”, 2010 EAGE Conference Exhibition SPE EUROPEC, F14, 5 pages.
Nolen-Hoeksema, R. C. et al., “Moment tensor inversion of microseisms from the B-sand propped hydrofracture, M-site, Colorado”, Tectonophysics, 336(1-4), pp. 161-181.
Thomsen, L., “Weak elastic anisotropy” Geophysics, 1986, 51(10), pp. 1954-1966.
Leaney, W. S., “Microseismic source inversion in anisotropic media”, University of British Columbia, 2014, 183 pages.
Yu, X. et al. “Multievent moment-tensor inversion for ill-conditioned geometries”, Geophysics, 2016, 81(2), pp. KS33-KS46.
Zhang, Z. et al. “Simultaneous inversion for microseismic event location and velocity model in Vaca Muerta Formation” Geophysics, vol. 83, KS23-KS34, 2018, 12 Pages.
Ozgen Karacan, C. et al., “Elastic and shear moduli of coal measure rocks derived from basic well logs using fractal statistics and radial basis functions”, International Journal of Rock Mechanics Mining Sciences, 2009, 46, pp. 1281-1295.
Press, W. H. “Integration of Ordinary Differential Equations”, Chapter 16 in Numerical recipes in C—The Art of Scientific Computing, Cambridge University Press, 1988, p. 720.

* cited by examiner

800

1410

| Depth, m | Vp, m/s | Vs, m/s | epsilon | delta | gamma |
|---|---|---|---|---|---|
| 1300 | 3950 | 2050 | 0 | 0 | 0 |
| 1400 | 3950 | 2050 | 0 | 0 | 0 |
| 1500 | 3950 | 2050 | 0 | 0 | 0 |
| 1600 | 3950 | 2050 | 0 | 0 | 0 |
| 1700 | 3950 | 2050 | 0 | 0 | 0 |
| 1800 | 3950 | 2050 | 0 | 0 | 0 |
| 1900 | 3950 | 2050 | 0 | 0 | 0 |
| 2000 | 3950 | 2050 | 0 | 0 | 0 |

Fig. 14

1610

Order 0

| Depth, m | Vp, m/s | Vs, m/s | epsilon | delta | gamma |
|---|---|---|---|---|---|
| 1300 | 4016.1 | 2011.72 | 0.01 | 0.03 | 0 |
| 1400 | 4016.1 | 2011.72 | 0.01 | 0.03 | 0 |
| 1500 | 4016.1 | 2011.72 | 0.01 | 0.03 | 0 |
| 1600 | 4016.1 | 2011.72 | 0.01 | 0.03 | 0 |
| 1700 | 4016.1 | 2011.72 | 0.01 | 0.03 | 0 |
| 1800 | 4016.1 | 2011.72 | 0.01 | 0.03 | 0 |
| 1900 | 4016.1 | 2011.72 | 0.01 | 0.03 | 0 |
| 2000 | 4016.1 | 2011.72 | 0.01 | 0.03 | 0 |

1620

Order 0 to 6

| Depth, m | Vp, m/s | Vs, m/s | epsilon | delta | gamma |
|---|---|---|---|---|---|
| 1300 | 4016.96 | 2011.08 | 0.01 | 0.03 | 0 |
| 1400 | 4016.21 | 2010.82 | 0.01 | 0.03 | 0 |
| 1500 | 4015.88 | 2011.09 | 0.01 | 0.03 | 0 |
| 1600 | 4016.06 | 2011.89 | 0.01 | 0.02 | 0 |
| 1700 | 4016.18 | 2012.6 | 0.01 | 0.02 | 0 |
| 1800 | 4015.75 | 2012.69 | 0.01 | 0.02 | 0 |
| 1900 | 4015.04 | 2012.34 | 0.01 | 0.02 | 0 |
| 2000 | 4014.77 | 2012.13 | 0.01 | 0.02 | -0.01 |

Fig. 16

1810

| Depth, m | Vp, m/s | Vs, m/s | epsilon | delta | gamma |
|---|---|---|---|---|---|
| 1300 | 3950 | 2050 | 0 | 0 | 0 |
| 1400 | 3950 | 2050 | 0 | 0 | 0 |
| 1500 | 3950 | 2050 | 0 | 0 | 0 |
| 1600 | 3950 | 2050 | 0 | 0 | 0 |
| 1700 | 3950 | 2050 | 0 | 0 | 0 |
| 1800 | 3950 | 2050 | 0 | 0 | 0 |
| 1900 | 3950 | 2050 | 0 | 0 | 0 |
| 2000 | 3950 | 2050 | 0 | 0 | 0 |

Fig. 18

2110

| Depth, m | Vp, m/s | Vs, m/s | epsilon | delta | gamma |
|---|---|---|---|---|---|
| 1300 | 4050.88 | 1995.83 | 0 | -0.01 | 0.01 |
| 1400 | 4019.24 | 2007.14 | 0 | 0.01 | 0.01 |
| 1500 | 4025.88 | 2007.64 | 0.01 | -0.01 | 0.01 |
| 1600 | 4021.75 | 1997.31 | 0 | -0.01 | 0.01 |
| 1700 | 4014.36 | 1989.56 | 0 | -0.01 | 0.01 |
| 1800 | 4034.88 | 1982.55 | -0.01 | 0 | 0.01 |
| 1900 | 4008.12 | 2007.08 | -0.01 | 0.02 | 0.01 |
| 2000 | 3985.9 | 2001.34 | -0.01 | 0 | 0.01 |

Fig. 21

GEOLOGIC VELOCITY MODELING FRAMEWORK

RELATED APPLICATIONS

This application is a National Stage Entry of International Application No. PCT/US/2022/074508, filed 4 Aug. 2022, claims priority to and the benefit of a U.S. Provisional Application having Ser. No. 63/229,139, filed 4 Aug. 2021, which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore (e.g., a borehole) may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.).

SUMMARY

A method can include receiving a sonic data log for a length interval of a borehole in a geologic environment as acquired via a tool disposed in the borehole; representing the sonic data log using an ordered series representation with respect to length for at least a portion of the length interval; and inverting the sonic data log using the ordered series representation to generate a model of at least a portion of the geologic environment, where the model includes sonic velocity related property values. A system can include a processor; memory accessible to the processor; processor-executable instructions stored in the memory and executable by the processor to instruct the system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, where the model includes sonic velocity related property values. One or more computer-readable storage media can include computer-executable instructions executable to instruct a computing system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, where the model includes sonic velocity related property values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 14 illustrates an example of a table;

FIG. 16 illustrates examples tables;

FIG. 18 illustrates an example of a table;

FIG. 21 illustrates an example of a table;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
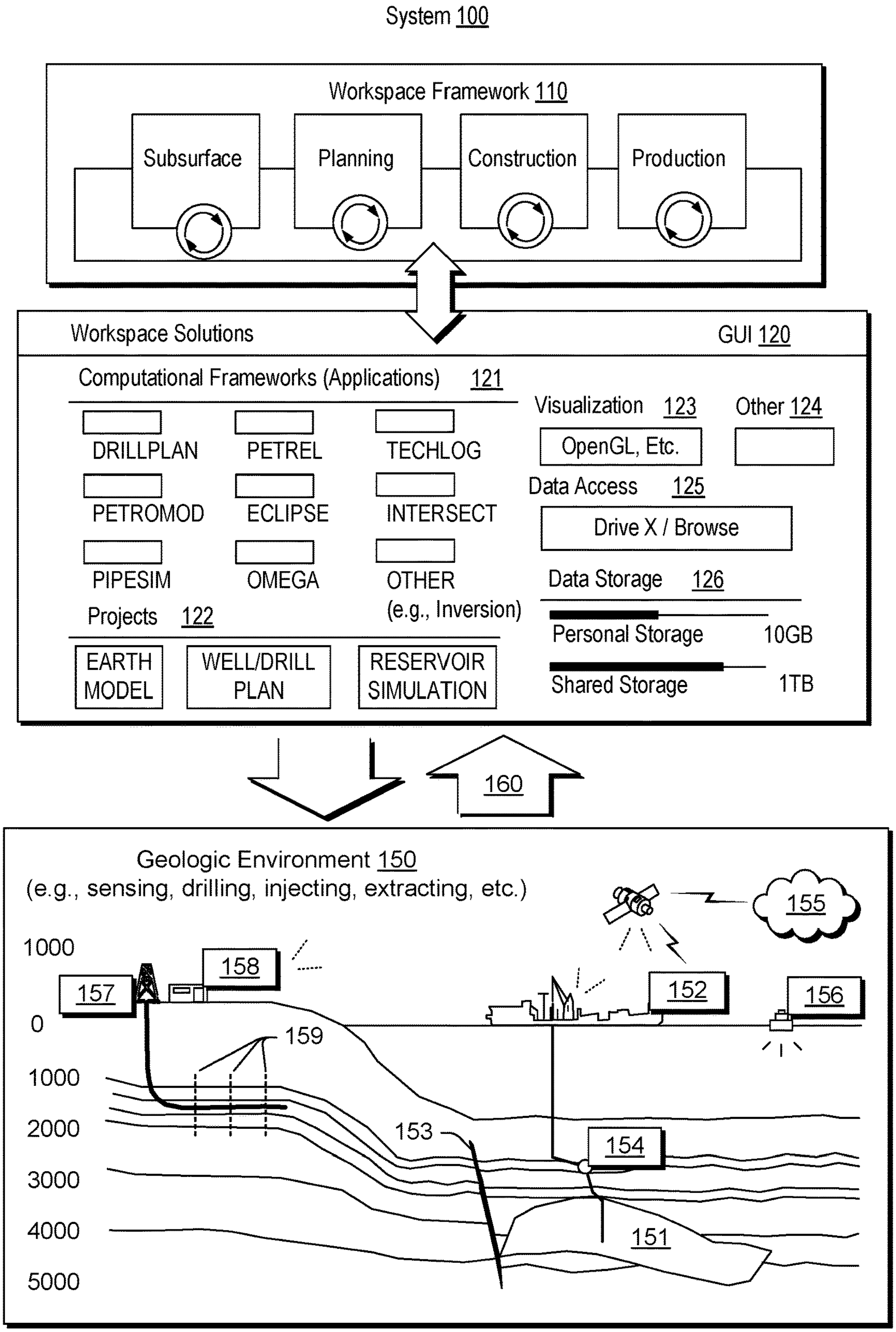
FIG. 1 illustrates an example of a system and examples of equipment in a geologic environment.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks (Schlumberger Limited, Houston, Texas). As to another type of framework, consider, for example, an inversion framework (InvF), which may be operable in combination with one or more other frameworks for inverting, modeling, etc. As an example, an InvF may be operable within or otherwise operatively coupled to a framework such as the OMEGA framework, a microseismic monitoring framework, a hydraulic fracturing framework, etc. As an example, an InvF may utilize one or more Fourier techniques for representation of one or more velocity related properties of a geologic environment with respect to a length dimension, which may be, for example, measured depth, true vertical depth, etc.

The DRILLPLAN framework provides for digital well construction planning and includes features for automation of repetitive tasks and validation workflows, enabling improved quality drilling programs (e.g., digital drilling plans, etc.) to be produced quickly with assured coherency.

As an example, where an edge framework (EF) can generate recommendations for drilling equipment, the EF may be operatively coupled to the DRILLPLAN framework. In such an example, interactions may exist, which may be automatic, where the edge framework is present locally at a rigsite and in communication with one or more other frameworks via one or more network connections. As an example, consider an EF that can dynamically generate recommendations responsive to progression of a plan being generated by a framework such as the DRILLPLAN framework.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques. As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages, which can be frameworks. For example, the DELFI environment can operatively couple various frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an example, various frameworks may be interoperative using one or more converters, whether for visualization processes or other interactive processes.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second). Through use of one or more seismic surveys, seismic data can be analyzed for model building, identification of hydrocarbon fluids, etc. As an example, a model can be built using seismic data that can be utilized to simulate fluid flow where such fluid can include hydrocarbons as may be presented in a hydrocarbon reservoir.

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system or computational framework) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

As an example, a framework that can simulate drilling, drilling equipment behaviors, etc., may be utilized. For example, consider the IDEAS framework (Schlumberger Limited, Houston, Texas), which utilizes the finite element method (FEM) to model various physical phenomena, which can include reaction force at a bit (e.g., using a static, physics-based model). The IDEAS framework can include an IDEAS2 simulator wrapper, an IDEAS2 configuration file and an IDEAS2 DLL (dynamic link library). A FEM simulation can utilize a grid or grids that discretize one or more physical domains. Equations such as, for example, continuity equations, are utilized to represent physical phenomena. The IDEAS framework provides for numerical experimentation that approximates real-physical experimentation. In various instances, a framework can be a simulator that performs simulations to generation simulation results that approximate results that have occurred, are occurring or may occur in the real-world. In the context of drilling, such a framework can provide for execution of scenarios that can be part of a workflow or workflows as to planning, control, etc. As to control, a scenario may be based on data acquired by one or more sensors during one or more well construction operations such as, for example, directional drilling. In such an approach, determinations can be made using scenario result(s) that can directly and/or indirectly control one or more aspects of directional drilling. For example, consider control of sliding and/or rotating as modes of performing directional drilling.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI environment, which is a secure, cognitive, cloud-based collaborative environment that integrates data and workflows with digital technologies, such as artificial intelligence and machine learning. Various workflows can be established and executed using multiple frameworks. For example, consider utilization of OMEGA and PETREL frameworks within the DELFI environment to build models suitable for use by a simulator (e.g., an ECLIPSE simulator, an INTERSECT simulator, etc.) and/or by a drilling framework (e.g., for planning, execution, etc.).

Figure 2:
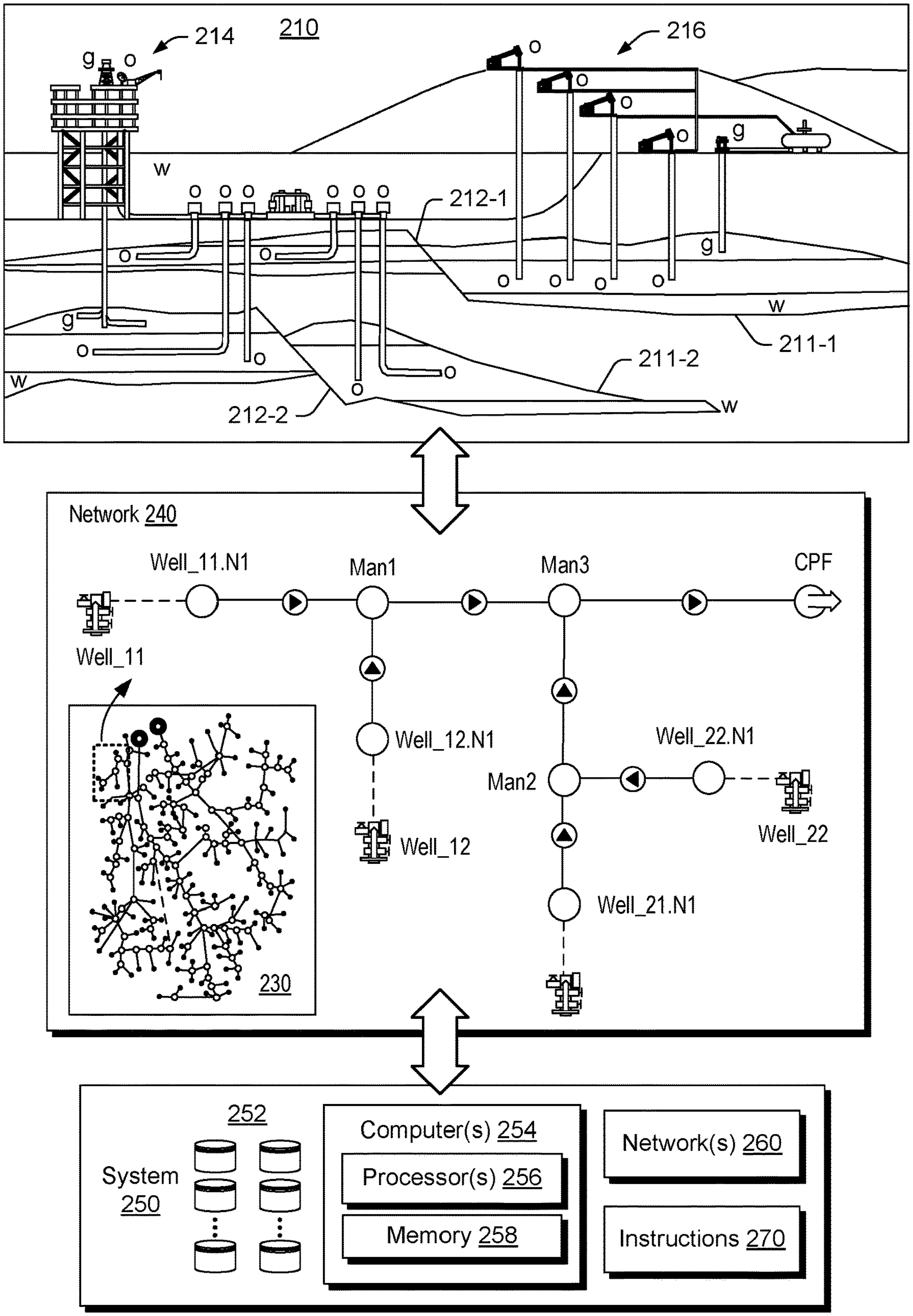
FIG. 2 illustrates an example of a system and examples of equipment in a geologic environment.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1.

In the example of FIG. 2, the various equipment 214 and 216 can include drilling equipment, wireline equipment, production equipment, etc. For example, consider the equipment 214 as including a drilling rig that can drill into a formation to reach a reservoir target where a well can be completed for production of hydrocarbons. In such an example, one or more features of the system 100 of FIG. 1 may be utilized. For example, consider utilizing the DRILLPLAN framework to plan, execute, etc., one or more drilling operations.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of oil and gas fluids from well locations along flowlines interconnected at junctions with final delivery at a central processing facility.

In the example of FIG. 2, various portions of the network 240 may include conduit. For example, consider a perspective view of a geologic environment that includes two conduits which may be a conduit to Man1 and a conduit to Man3 in the network 240.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform modeling, simulation, etc. As an example, one or more methods, techniques, etc. may be performed using one or more sets of instructions, which may be, for example, the instructions 270 of FIG. 2.

Various equipment that may be at a site can include rig equipment. For example, consider rig equipment that includes a platform, a derrick, a crown block, a line, a traveling block assembly, drawworks and a landing (e.g., a monkeyboard). As an example, the line may be controlled at least in part via the drawworks such that the traveling block assembly travels in a vertical direction with respect to the platform. For example, by drawing the line in, the drawworks may cause the line to run through the crown block and lift the traveling block assembly skyward away from the platform; whereas, by allowing the line out, the drawworks may cause the line to run through the crown block and lower the traveling block assembly toward the platform. Where the traveling block assembly carries pipe (e.g., casing, etc.), tracking of movement of the traveling block may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

Figure 3:
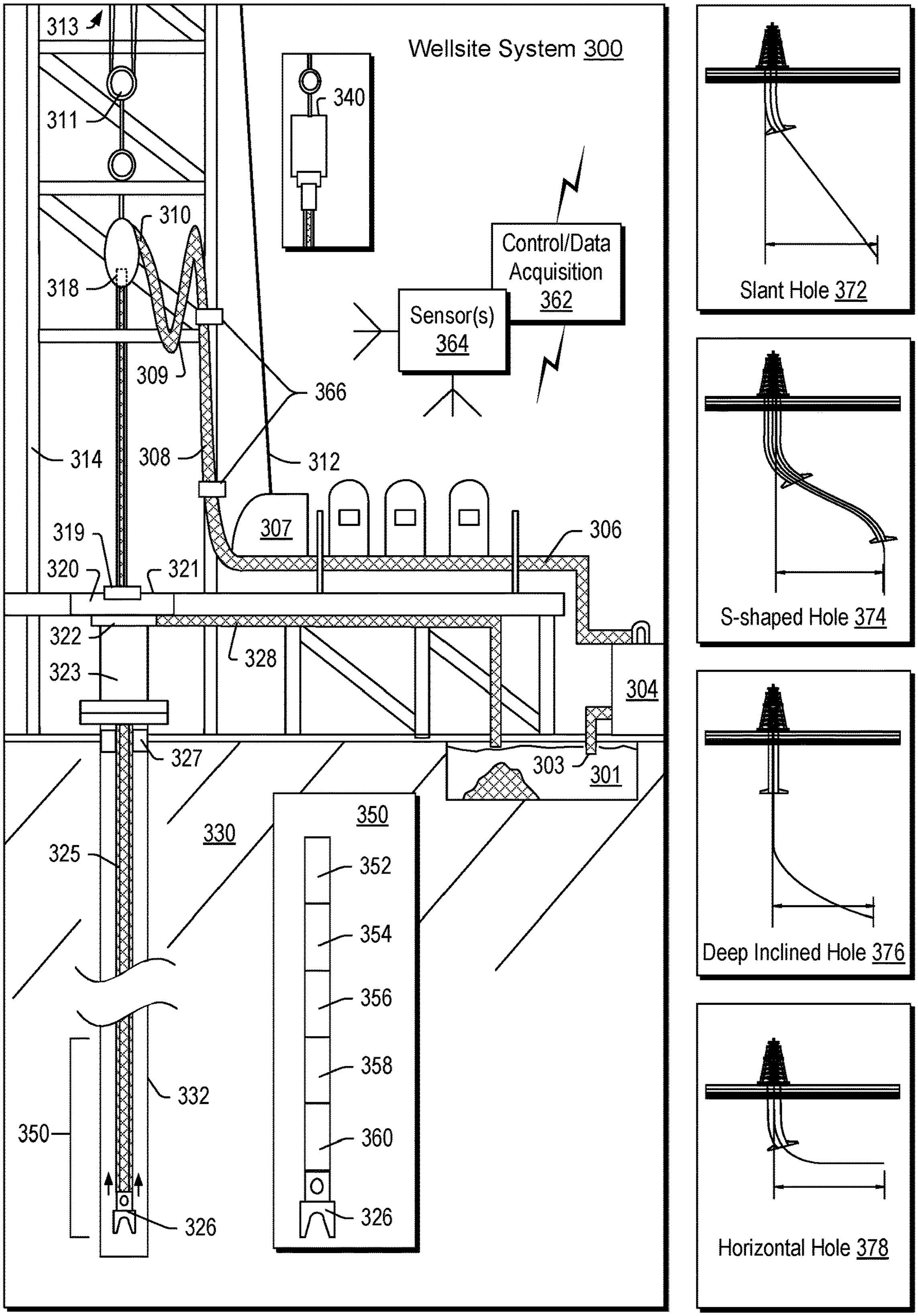
FIG. 3 illustrates examples of equipment and examples of hole types.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via a the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 356 may include equipment for generating electrical power, for example, to power various components of the drillstring 325. As an example, the MWD tool 356 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets (e.g., a hydrocarbon reservoir, etc.).

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus. Risk of sticking can depend on various factors, including formation factors, drilling factors, etc. For example, certain types of rocks may be more prone to collapse during drilling, certain drilling fluids may interact with certain types of rocks in a detrimental manner, drilling fluid density can impact downhole pressure exerted on a borehole and/or reservoir fluid, etc. Data from instruments in boreholes (e.g., wirelines, logging while drilling, etc.) and/or seismic surveys may facilitate reduction of risks and non-productive time (NPT) for various field operations (e.g., drilling, fracturing, completions, etc.).

Figure 4:
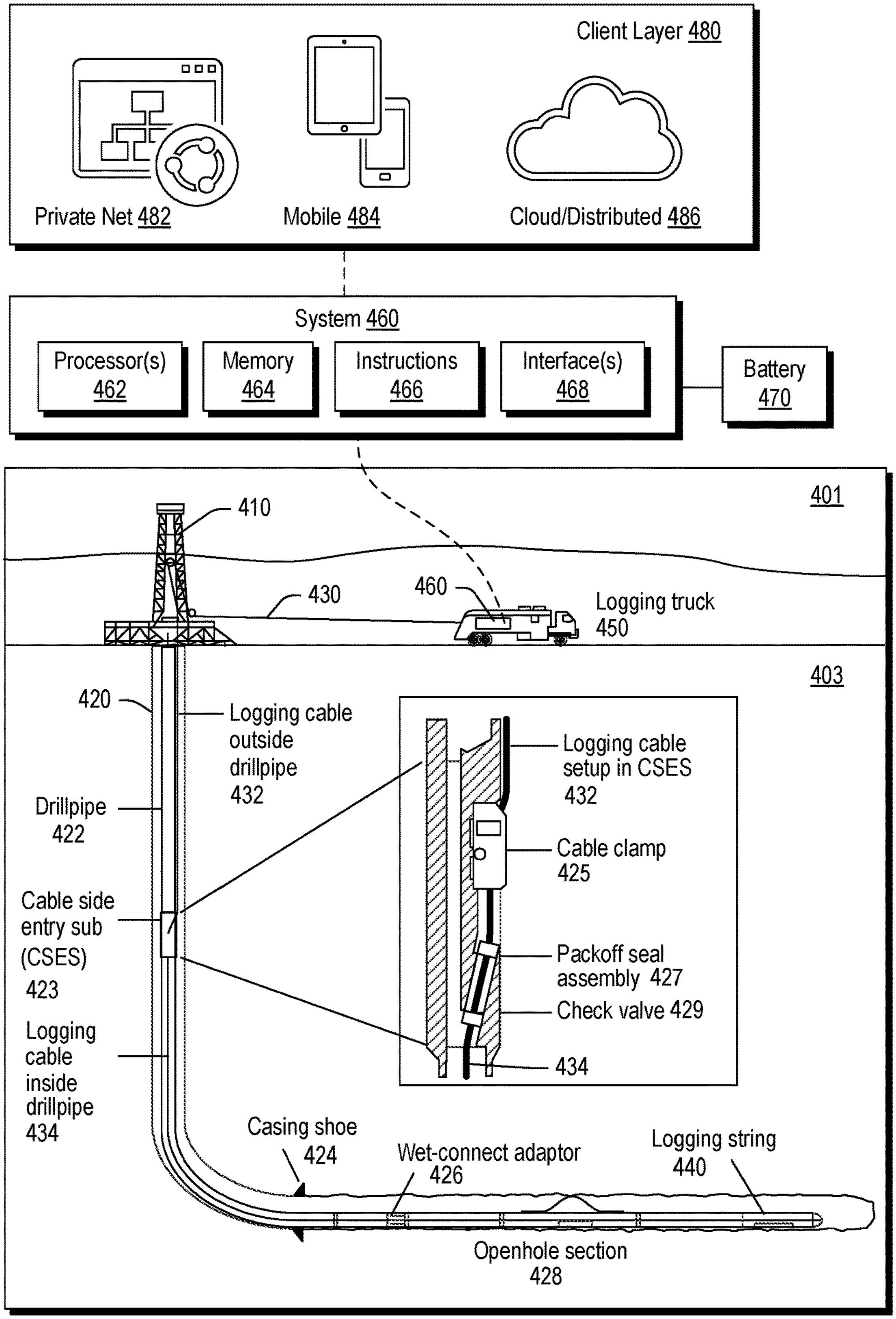
FIG. 4 illustrates an example of a system and examples of equipment in a geologic environment.

FIG. 4 shows an example of an environment 401 that includes a subterranean portion 403 where a rig 410 is positioned at a surface location above a bore 420. In the example of FIG. 4, various wirelines services equipment can be operated to perform one or more wirelines services including, for example, acquisition of data from one or more positions within the bore 420.

As an example, a wireline tool and/or a wireline service may provide for acquisition of data, analysis of data, data-based determinations, data-based decision making, etc. Some examples of wireline data can include gamma ray (GR), spontaneous potential (SP), caliper (CALI), shallow resistivity (LLS and ILD), deep resistivity (LLD and ILD), density (RHOB), neutron porosity (BPHI or TNPH or NPHI), sonic (DT) and photoelectric (PEF).

As an example, sonic data can include data for formation compressional slowness, for example, based on the transit time between transmitter(s) and receiver(s). As an example, a wireline sonic measurement can be acquired using an acoustic transducer that emits a sonic signal (e.g., consider a signal within a range of approximately 10 kHz and 30 kHz) that can be detected at two receivers (e.g., farther up the hole). In such an example, the time between emission and reception can be measured for each receiver, and subtracted to give the traveltime in the interval between the two receivers. If the receivers are two distance units apart, then this time is divided by two to give the interval transit time, or slowness, of the formation (e.g., in units of time over distance). In such an approach, the first arrival at the receiver is a wave that has traveled from the transmitter to the borehole wall, where it has generated a compressional wave in the formation. Some of this wave is critically refracted up the borehole wall, generating head waves in the borehole fluid as it progresses. Some of these strike the receiver, arriving in most instances ahead of other signals traveling directly through the mud. Where a logging tool is parallel to a borehole wall, the traveltime in the mud can be cancelled by taking the difference between the traveltime to the two receivers. An irregular hole or a tilted tool may be handled using borehole compensation. As to depth of investigation (DOI), it can depend on the slowness, the transmitter-to-receiver spacing and the presence or absence of an altered zone. DOI can be within an invaded zone and, for example, be of the order of centimeters (e.g., consider up to approximately 10 cm). For sonic measurements such as shear, flexural and Stoneley slownesses and amplitudes, a full waveform may be recorded, for example, using an array-sonic tool and process with a technique such as slowness-time coherence. As an example, one or more sonic measurements can be in the form of a log, which may be referred to as a sonic log. A sonic log may display traveltime of P-waves versus depth. A sonic log or sonic logs may be recorded by movement of a tool (e.g., LWD, wireline, etc.) in a bore where, as explained, the tool emits a sound wave or sound waves that travel to a formation and back to a receiver or receivers.

As explained, the frequencies for a sonic tool can be higher than those utilized for seismic surveys. A higher frequency can provide for greater resolution, though, with lesser penetration (e.g., greater attenuation of energy). For example, a marine equipment seismic survey may utilize frequencies between approximately 8 Hz and approximately 80 Hz and broadband marine seismic survey systems may utilize frequencies from approximately 2.5 Hz up to approximately 200 Hz. On land, a vibrator (e.g., a truck, etc.) may produce signal frequencies down to approximately 1.5 Hz. Sonic waves in a borehole at 10 kHz propagating in a 5,000 m/s formation have a wavelength of approximately 0.5 m; whereas, seismic survey wavelengths can measure in the tens of meters.

In the example of FIG. 4, the bore 420 includes drillpipe 422, a casing shoe 424, a cable side entry sub (CSES) 423, a wet-connector adaptor 426 and an openhole section 428. As an example, the bore 420 can be a vertical bore or a deviated bore where one or more portions of the bore may be vertical and one or more portions of the bore may be deviated, including substantially horizontal.

In the example of FIG. 4, the CSES 423 includes a cable clamp 425, a packoff seal assembly 427 and a check valve 429. These components can provide for insertion of a logging cable 430 that includes a portion 432 that runs outside the drillpipe 422 to be inserted into the drillpipe 422 such that at least a portion 434 of the logging cable runs inside the drillpipe 422. In the example of FIG. 4, the logging cable 430 runs past the wet-connect adaptor 426 and into the openhole section 428 to a logging string 440.

As shown in the example of FIG. 4, a logging truck 450 (e.g., a wirelines services vehicle) can deploy the wireline 430 under control of a system 460. As shown in the example of FIG. 4, the system 460 can include one or more processors 462, memory 464 operatively coupled to at least one of the one or more processors 462, instructions 466 that can be, for example, stored in the memory 464, and one or more interfaces 468. As an example, the system 460 can include one or more processor-readable media that include processor-executable instructions executable by at least one of the one or more processors 462 to cause the system 460 to control one or more aspects of equipment of the logging string 440 and/or the logging truck 450. In such an example, the memory 464 can be or include the one or more processor-readable media where the processor-executable instructions can be or include instructions. As an example, a processor-readable medium can be a computer-readable storage medium that is not a signal and that is not a carrier wave.

FIG. 4 also shows a battery 470 that may be operatively coupled to the system 460, for example, to power the system 460. As an example, the battery 470 may be a back-up battery that operates when another power supply is unavailable for powering the system 460 (e.g., via a generator of the wirelines truck 450, a separate generator, a power line, etc.). As an example, the battery 470 may be operatively coupled to a network, which may be a cloud network. As an example, the battery 470 can include smart battery circuitry and may be operatively coupled to one or more pieces of equipment via a SMBus or other type of bus.

As an example, the system 460 can be operatively coupled to a client layer 480. In the example of FIG. 4, the client layer 480 can include features that allow for access and interactions via one or more private networks 482, one or more mobile platforms and/or mobile networks 484 and via the "cloud" 486, which may be considered to include distributed equipment that forms a network such as a network of networks. As an example, the system 460 can include circuitry to establish a plurality of connections (e.g., sessions). As an example, connections may be via one or more types of networks. As an example, connections may be client-server types of connections where the system 460 operates as a server in a client-server architecture. For example, clients may log-in to the system 460 where multiple clients may be handled, optionally simultaneously.

Figure 5:
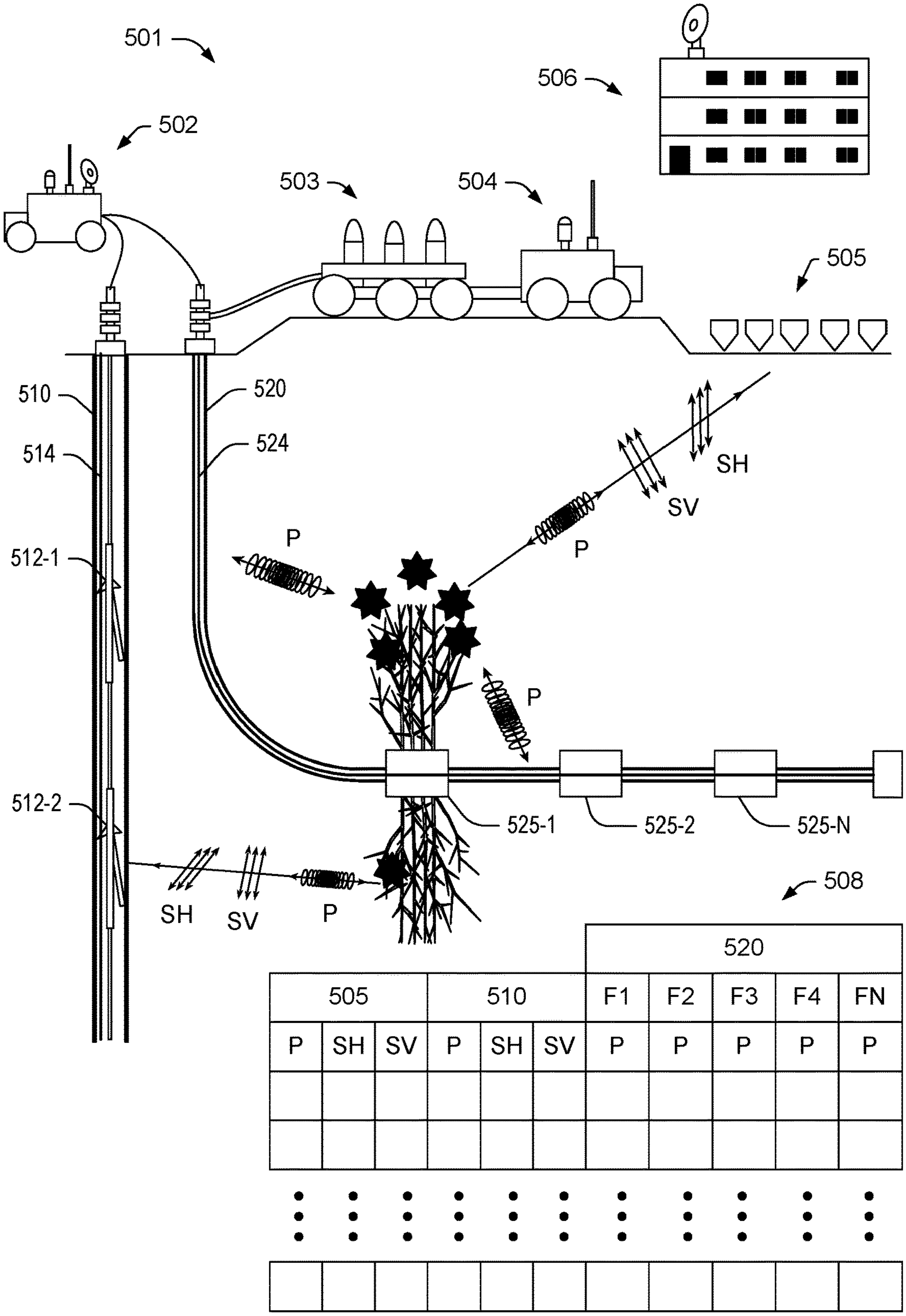
FIG. 5 illustrates an example of a system for hydraulic fracturing and microseismic monitoring.

FIG. 5 shows an example of a geologic environment 501 that includes monitoring equipment 502, a pump 503, equipment 504, a seismic sensor or receiver array 505 and a remote facility 506. As shown, various types of communication may be implemented such that one or more pieces of equipment can communicate with one or more other pieces of equipment. As an example, equipment can include geo-positioning equipment (e.g., GPS, etc.). As an example, equipment can include one or more satellites and one or more satellite links (e.g., dishes, antennas, etc.).

In the example of FIG. 5, a monitoring well 510 and a treatment well 520 are disposed in the geologic environment 501. The monitoring well 510 includes a plurality of sensors 512-1 and 512-2 and optionally a fiber cable sensor 514 and the treatment well 520 optionally includes a fiber cable sensor 524 and one or more sets of perforations 525-1, 525-2, 525-N (e.g., as generated by perforating equipment, which may utilize force generated via one or more mechanisms).

Equipment in the example of FIG. 5 can be utilized to perform one or more methods. As an example, data associated with hydraulic fracturing events may be acquired via various sensors. As an example, P-wave data (compressional wave data) can be utilized to assess such events (e.g., microseismic events). Such information may allow for adjusting one or more field operations. As an example, data acquired via the fiber cable sensor 524 can be utilized to generate information germane to a fluid flow-based treatment process (e.g., to determine where fluid pumped into a well may be flowing, etc.).

FIG. 5 shows an example of a table or data structure 508 with some examples of information that may be acquired via the seismic sensor array 505 (e.g., P-wave as "P", SH-wave as "SH", SV-wave as "SV"), sensors of the monitoring well 510 (e.g., P, SH, SV) and sensors of the treatment well 520 (e.g., P). In the example of FIG. 5, information may be sensed with respect to position, for example, sensor position, position along a fiber cable sensor, etc. As shown, the fiber cable sensor 524 may sense information at a variety of positions along the fiber cable sensor 524 within the treatment well 520 (see, e.g., F1, F2, F3, F4 to FN).

In the example of FIG. 5, the set of perforations 525-1 are shown as including associated fractures and microseismic events that generate energy that can be sensed by various sensors in the geologic environment 501. Arrows indicate a type of wave that may be sensed by an associate sensor. For example, as mentioned with respect to the table or data structure 508, the seismic sensor array 505 can sense P, SV and SH waves while the fiber cable sensor 524 can sense P waves.

As an example, the equipment 502 can be operatively coupled to various sensors in the monitor well 510 and the treatment well 520. As an example, the equipment 502 may be on-site where wires are coupled from sensors to the equipment 502, which may be vehicle-based equipment (e.g., a data acquisition and/or control truck, etc.). As an example, the equipment 504 may control the pump 503 (e.g., or pumps) that can direct fluid into the treatment well 520. For example, a line is shown as a conduit that is operatively coupled between the pump 503 and the treatment well 520.

As an example, information acquired by the equipment 502 may be utilized to control one or more treatment processes controlled by the equipment 504. For example, the equipment 502 and the equipment 504 may be in direct and/or indirect communication via one or more communication links (e.g., wire, wireless, local, remote, etc.). In such an example, information acquired during a treatment process can be utilized in real-time (e.g., near real-time) to control the treatment process. For example, the equipment 502 can acquire data via sensors in the wells 510 and 520 and output information to the equipment 504 for purposes of controlling an on-going treatment process. As an example, such information may be utilized to control and/or to plan a subsequent treatment process, for example, additionally or alternatively to controlling an on-going treatment process.

As an example, a treatment process can include hydraulic fracturing. As an example, acquired data can include microseismic event data. As an example, a method can include determining the extent of rock fracturing induced by a treatment process, which may aim to stimulate a reservoir.

As an example, a method can include hydraulic fracture monitoring (HFM). As an example, a method can include monitoring one or more types of reservoir stimulation processes where one or more of such processes may be performed in stages. As an example, a stage may be of a duration of the order of hours or longer (e.g., several days). As an example, a method can include determining the presence, extent, and/or associated volume of induced fractures and fracture networks, which may be utilized for calculating an estimated reservoir stimulation volume (e.g., ESV) that may assist, for example, in economic evaluation of well performance.

As an example, real-time data may be rendered to a display (e.g., as a plot, plots, etc.). As an example, real-time data may be assessed in real-time (e.g., near real-time that includes computation and transmission times) during perforation flow for one or more sets of perforations. In such an example, such assessments may allow a treatment process to be optimized during the treatment process in real-time (e.g., near real-time). Such assessments may be utilized for one or more post treatment analyses, for example, to plan, perform, control, etc. one or more future treatments (e.g., in a same well, a different well, etc.).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. As an example, a frequency range for measuring microseismic waves may be from approximately 10 Hz to approximately 1000 Hz. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 6:
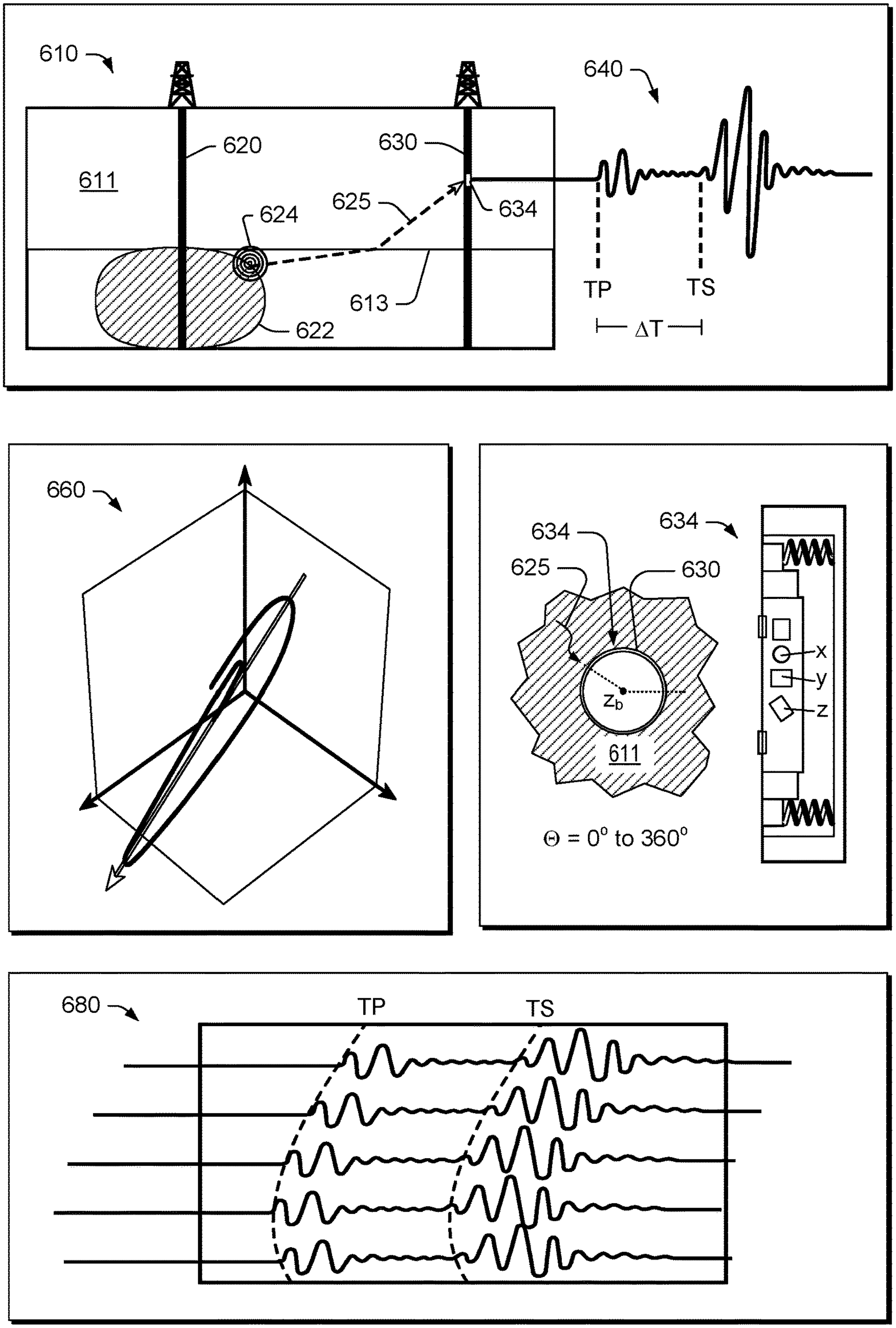
FIG. 6 illustrates examples of methods and equipment for microseismic monitoring.

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy 625 of a microseismic event 624 may travel through a portion of the geologic environment 611, optionally interacting with one or more reflectors 613, and pass to the monitoring bore 630 where at least a portion of the energy 625 may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

As shown in the example of FIG. 6, one or more sensors of the sensing unit 634 can be oriented in the monitoring bore 630 with respect to the position of the microseismic event 624 and/or the energy 625 as received by at least one of the one or more sensors of the sensing unit 634. As an example, the orientation of a sensor may be defined in a coordinate system or coordinate systems such that orientation information may be defined as to one or more microseismic events and/or energy received as associated with one or more microseismic events. FIG. 6 shows an approximate diagram of a cross-sectional view of the sensing unit 634 in the monitoring bore 630 of the geologic environment 611 where energy 625 is arriving at the sensing unit 634 at an angle Θ, which may be defined in a range of angles from approximately 0 degrees to approximately 360 degrees (e.g., where 0 and 360 degrees may be the same).

As an example, a sensing unit (e.g., sensing body) can include one or more components that may provide information as to position. For example, consider an inclinometer and/or a magnetometer. As an example, consider one or more components of a tool that includes a three-axis inclinometer and a three-axis magnetometer to make measurements for determining the three parameters of tool orientation: tool deviation, tool azimuth, and relative bearing. As an example, such information may be acquired, where available, and utilized for purposes of sensor orientation calibration. As an example, a joint calibration of sensor orientation and a velocity model may utilize such information in addition to other information (e.g., seismic data, etc.).

Microseismic energy as associated with microseismic events (e.g., microseisms) can be induced by change in stress and pore pressure associated with one or more hydraulic fracturing operations (e.g., perforating, injecting fluid, etc.) and/or change in a subterranean environment caused by one or more other field operations (e.g., a drill bit impacting rock, etc.). Microseismic energy can be generated by slippages or tensile deformations that occur along pre-existing planes of weakness (e.g., natural fractures). As an example, if an array of tri-axial receivers is situated at depth near a hydraulic fracture, compressional (primary or P) and shear (secondary or S) waves may be detected and locations of the events calculated (e.g., estimated, etc.). As microseisms tend to be quite small (e.g., on a Richter scale), sensor related factors can affect an ability to measure the energy and/or determine a location as an origin of the energy. The location of an individual microseism may be deduced, for example, from arrival times of the P and S waves (e.g., to provide distance and elevation) and from particle motion of the P-wave (e.g., to provide azimuth and elevation from a sensor or sensor array to the event). As to particle motion information, as particle motion can be affected by various factors including gravity, sensor orientation can be determined through a process known as calibration. The output of a calibration process for one or more sensors (e.g., of a sensing unit, a sensor array, etc.) can be orientation information (e.g., sensor orientation calibration information, etc.). As an example, one or more types of energy may be sensed to facilitate sensor orientation calibration, which, as mentioned, can be part of a process that is performed jointly with velocity model calibration. As to types of energy, energy generated by one or more of perforation shots, string shots, or other seismic sources in a treatment well and/or other nearby well(s) may be utilized. Factors that can impact accuracy of microseismic locations and source parameter determination include the accuracy of sensor positioning (e.g., location and orientation), knowledge of the velocity structure in the reservoir (e.g., velocity model), and accuracy of first arrival picks and particle motion estimates for single-well monitoring. Some factors are tool issues and may be addressed by improved tool features (e.g., sensors, electrical noise, vector fidelity, coupling or sampling rate). As mentioned, a joint calibration of sensor orientation and a velocity model can improve accuracy of microseismic event determinations (e.g., as to one or more of location, time, magnitude, etc.).

As an example, distance (d) to an event may be derived by measuring a time difference (ΔT) between arrival times for a P-wave (TP) and an S-wave (TS). The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

Azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during multistage fracture treatments may provide disperse “clouds” of events (e.g., located at individual event hypocenters). As an example, a method can include analyzing clouds of events to extract planar-type features, which may be indicative of fracture location, directions of stresses, etc.

Effectiveness of hydro-fracturing, as a stimulation method, can depend on multiple variables and competing effects. For instance, a hydraulic fracture, or stage-fracture, may be expected to propagate deeply into a pay zone and increase surface area through which hydrocarbons can be drained from a formation to a well. As to predicting behavior, for example, via modeling, various variables (e.g., local stress, natural fracture network, injection rate, fluid viscosity, etc.) can act together to determine the size, orientation, aperture and geometry of the resulting stage-fracture values, for such variables may be not be known a priori, may be known with some uncertainty, etc.

A velocity model can account for how seismic energy travels within a geologic environment. Velocity, as a property of a geologic environment, can be a medium-distance divided by a traveltime of seismic energy. Velocity can be determined via one or more techniques (e.g., laboratory measurements, acoustic logs, vertical seismic profiles, velocity analysis of seismic data, etc.). Velocity may vary vertically, laterally and azimuthally in anisotropic media such as rocks; noting that velocity tends to increase with depth in the Earth because compaction reduces porosity. Velocity may vary as a function of how it is derived from data.

In seismology, seismic data, vertical seismic profiles and/or well log data may be used to perform an inversion that can generate a model as a result where the model can model layers, for example, including their thickness (e.g., h), density (e.g., ρ) and P- and S-wave velocities (e.g., Vp and Vs or $V_{SH}$ and $V_{SV}$).

Figure 7:
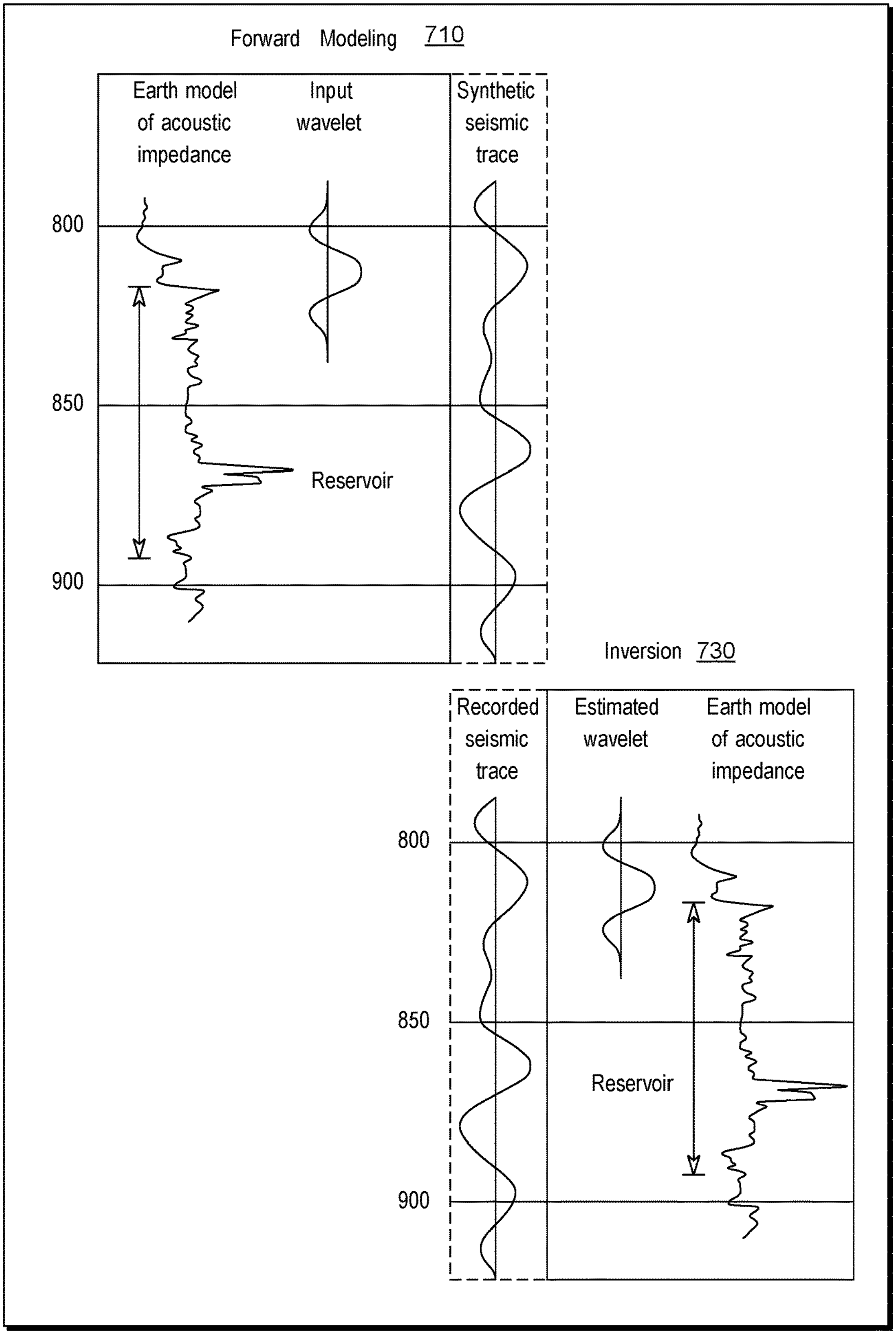
FIG. 7 illustrates examples of method for forward modeling and inversion.

FIG. 7 shows an example of forward modeling 710 and an example of inversion 730 (e.g., an inversion or inverting).

As shown, the forward modeling 710 progresses from an earth model of acoustic impedance and an input wavelet to a synthetic seismic trace while the inversion 730 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Texas) may be implemented to perform an inversion. As an example, a framework such as the Linearized Orthotropic Inversion framework (Schlumberger Limited, Houston, Texas) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Table 1, below, shows some examples of data, which may be referred to as "log" data that are associated with petrophysical and rock physics properties calculation and analysis.

TABLE 1

Examples of Log Data (e.g., data logs)

| Name | Uses |
|---|---|
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, σ, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (AI, SI, σ, etc.) calculation, etc. |
| Photoelectric (PEF) | Mineral determination (for lithology interpretation) |

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

As explained, a velocity model can be generated to characterize a geologic environment. A model can be a representation of a geologic environment that may be used for one or more purposes. A velocity model may be utilized to identify one or more features of a geologic environment, such as, for example, a depth of a formation of interest (e.g., a reservoir, etc.). As explained, a velocity model can be utilized for purposes of locating microseismic events that are generated during a hydraulic fracturing operation.

As an example, a velocity model can be utilized for borehole seismic (e.g., VSP, microseismic, and crosswell), surface seismic processing, drilling, etc. As shown in the examples of FIG. 7, a model can be utilized to generate behavior and/or observed behavior can be utilized to generate a model.

As explained, a sonic log can be acquired by wireline tools (e.g., dipole sonic tool, etc.) and/or LWD tools (e.g., consider the SONIC SCANNER tool, Schlumberger Limited, Houston, Texas) that utilize frequencies that are greater than the frequencies of a seismic survey. As such a sonic log can be of a greater resolution as to a vertical and/or a measured depth (e.g., as a sonic log is a borehole log) when compared to a seismic survey.

Figure 8:
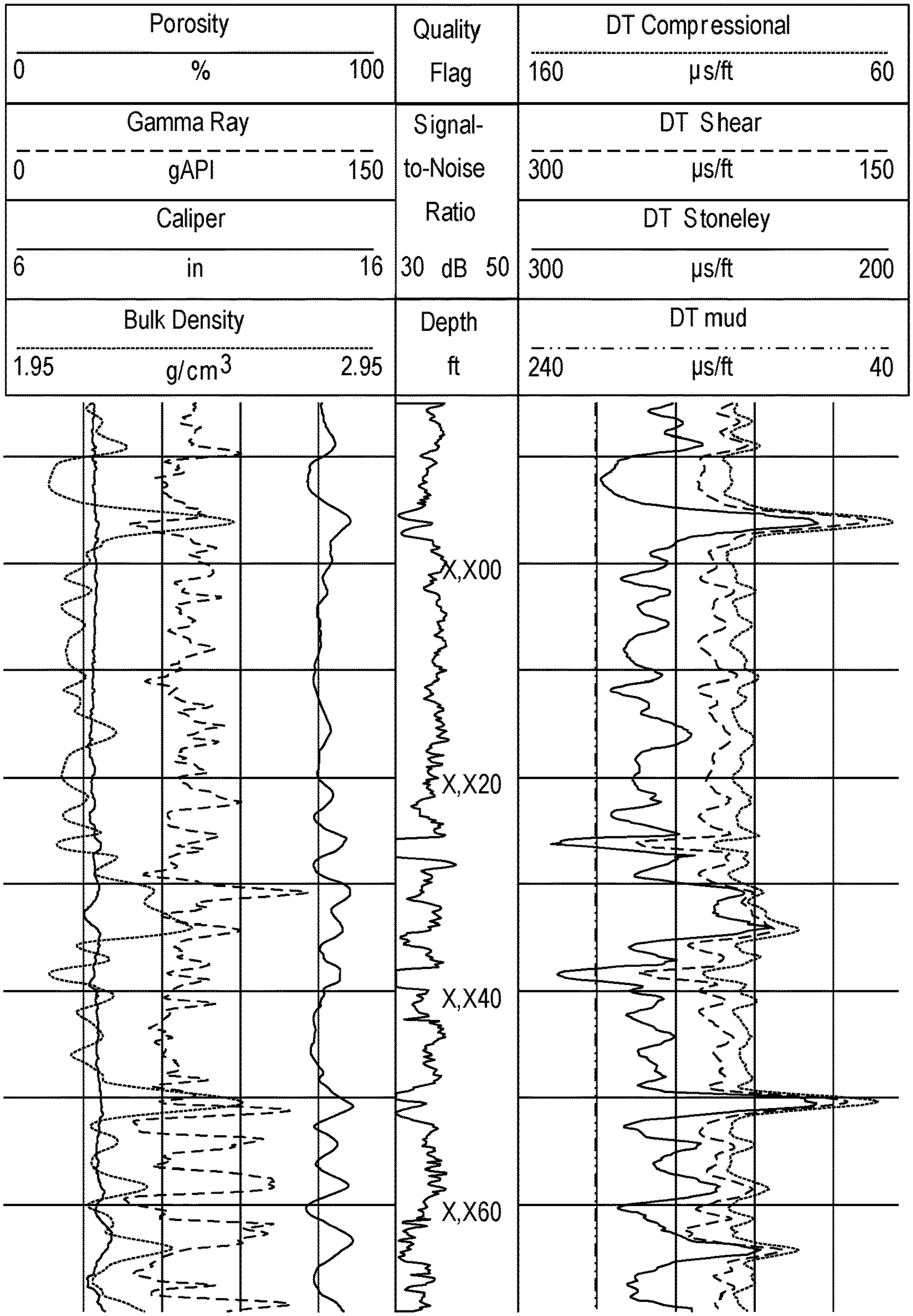
FIG. 8 illustrates examples of data logs for properties of a geologic environment.

FIG. 8 shows an example plot 800 of various logs as acquired by a tool such as the SONIC SCANNER tool. In a left hand column, porosity in percent, gamma ray in gAPI, caliper in inches, and bulk density in grams per cubic centimeter are shown with respect to depth in feet. In a right hand column, compressional wave slowness, shear wave slowness, Stoneley wave slowness and mud slowness are shown, each in units of microseconds per foot (e.g., note that the scales are from a greater slowness to a lesser slowness in moving from left to right). The sonic slowness data in the plot 800 show variations with respect to depth over a range of approximately 80 feet.

As an example, a method can include building a velocity model by using one or more sonic logs that are upscaled and/or blocked to lead to a 1D velocity model representing a zone of interest and its surroundings. In such an approach, an initial velocity model can be subsequently calibrated using one or more of various types of seismic-scale inversion algorithms. As an example, a collection of 3D velocity models incorporating the structural component of a zone of interest can be prepared using one or more 1D velocity models.

The PETREL framework provides various features for generation of velocity models, for example, based on different types of data. As an example, multiple velocity models can be built to test different velocity parameter scenarios and obtain a better understanding of structural uncertainty. As an example, a method can include calibrating wells with seismic velocities obtained from processing to build more accurate velocity models and use 3D grid properties for depth conversion, which is useful for conversion of complex structures, such as reverse fault and salt environments. As an example, a framework may utilize a layer-cake approach for velocity model construction that can provide for velocity variations for each layer (e.g., while preserving relationships between faults and horizons, etc.). In various instances, velocity functions may be handled as linear functions such as V=Vo, V=Vo+kZ, V=Vo+k(Z−Zo), and V=Vo+kT and average and interval velocity cubes or average grid properties. One or more quality control (QC) features may be generated from a velocity model (e.g., point sets, time and velocity logs, time-to-depth and velocity functions, velocity maps, residual attributes on well tops, well reports, etc.). The PETREL framework provides features for time and depth approach for subsurface objects, which can include surfaces, horizons, faults and multi-Z interpretations, points, well data (logs and tops), 2D and 3D seismic data, and pillar and stair-stepped 3D grids.

A velocity model may be a 1D model or a higher dimensional model. As an example, one or more 1D velocity models can be utilized to generate one or more higher dimensional velocity models. As explained, a sonic data log can be of a greater resolution than a seismic survey where the sonic data log can be utilized in generating a 1D velocity model. A velocity model for processing seismic survey data can aim to produce a high quality seismic image via spatial accuracy and appropriate conversion of data from time to depth. As an example, a velocity model may be used in one or more inversions, for example, to estimate one or more physical properties of rocks. Velocity modeling can involve use of one or more of different types information (e.g., seismic survey data, data logs, etc.), which may be part of a velocity model calibration workflow.

As an example, a 1D velocity model can be built using a series approach. For example, consider use of a Fourier series, which is a periodic function composed of harmonically related sinusoids, combined by a weighted summation. With appropriate weights, one cycle (or period) of the summation can be made to approximate an arbitrary function in an interval (or an entire function if it is also periodic). Using a series approach, a summation can be a synthesis of another function. For example, consider a 1D velocity model that is composed of a series of terms where such terms can be weighed and summed to represent a zone of interest. As an example, a framework such as the PETREL framework may include or be operatively coupled to a series approach component or components for purposes of inversion (see, e.g., FIG. 1 and "Inversion").

As an example, one or more of the types of slowness data in the example plot 800 of FIG. 8 may be represented using a series approach. For example, consider representing compressional wave slowness with respect to depth as a summation of terms of a Fourier series. In such an example, the Fourier series is not taken to be an amplitude in a time domain type of series but rather a slowness in a depth domain (e.g., vertical depth, measured depth, etc.). As an example, a series approximate approach may be implemented with or without blocking. For example, with blocking, each block may be approximated using one or more terms (e.g., components) of a series. In such an example, a constant or "DC" type of component (e.g., zero-order) may represent a block sufficiently where the slowness is relatively constant in the block; whereas, where slowness varies, more than a constant or "DC" type of component may be utilized (e.g., more than a zero-order component or term). A series approach to representing a sonic log can be computationally efficient, particularly for a method that includes inverting (e.g., an inversion).

As an example, data as in the plot 800 of FIG. 8 may be represented in terms of velocity rather than slowness. Slowness or interval transit time is the amount of time for a wave to travel a certain distance, proportional to the reciprocal of velocity. As shown in FIG. 8, slowness may be measured in microseconds per foot and symbolized by "DT". P-wave interval transit times for common sedimentary rock types tend to range from 43 (dolostone) to 160 (unconsolidated shales) microseconds per foot, and can be distinguished from measurements of steel casing, which has a relatively consistent transit time of 57 microseconds per foot. As an example, a sonic tool may be calibrated inside a borehole, for example, opposite beds of pure and known lithology, such as anhydrite (50.0 μs/ft), salt (66.7 μs/ft), or inside casing (57.1 μs/ft) of a cased portion of a borehole, etc.

As explained, sonic data may be acquired using one or more types of tools, which may be wireline deployed or drillstring deployed. A drillstring deployment may log while drilling where a speed may be determined by a rate of penetration (ROP) or a rate of tripping in or tripping out or otherwise controlled. In a wireline operation, logging speed may be approximately 1500 m/h or another speed depending on desired resolution (e.g., along an axis of a borehole).

A velocity model's resolution can be controlled at least in part by two antagonistic factors. The first antagonistic factor can be resolution of the deliverables, where higher tends to be better. The second antagonistic factor can be linked to stability associated to an inversion, where lower tends to be better as the number of unknowns is smaller. As an example, a series based approach can provide for balancing the two aforementioned antagonistic factors in the velocity model building and calibration.

Figure 13:
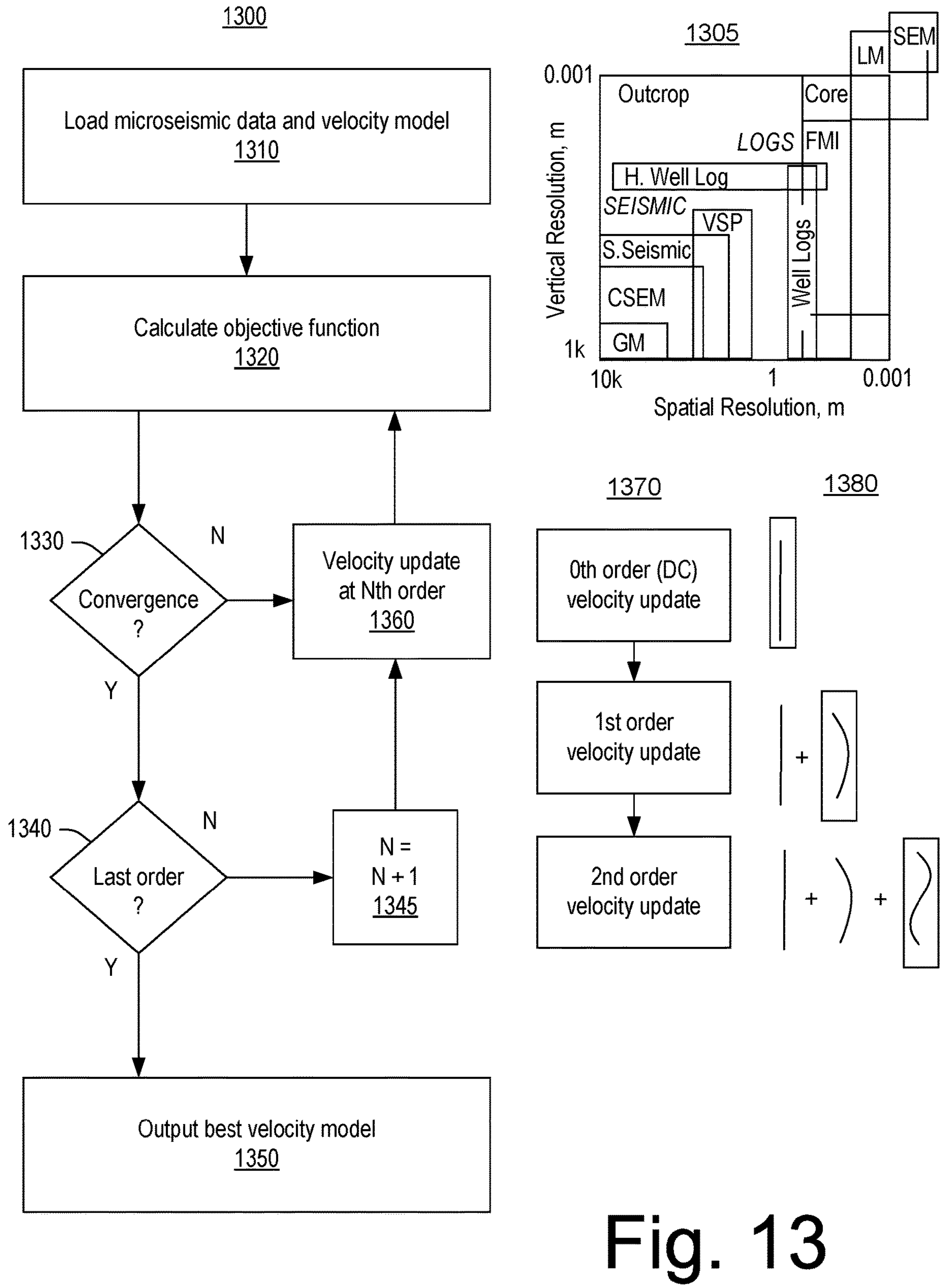
FIG. 13 illustrates an example of a method and an example of a graphic.

As to building a seismic velocity model from sonic data, considering the wavelength of borehole seismic data acquired during a vertical seismic profile (VSP) survey of sort (ZVSP, VIVSP, walk-away VSP, 3D VSP, etc.), a crosswell seismic survey or a microseismic monitoring campaign, recorded data tend to be sensitive to heterogeneities at the meter to deca-meter scale; whereas, sonic data tend to robustly provide a model at this resolution because the sonic wavelength is much shorter than the borehole seismic wavelength (see, e.g., the graphic 1305 of FIG. 13). As explained, sonic data tend to be at a substantially higher frequency and hence spatial resolution than seismic survey data; noting that attenuation of energy increases with an increase in frequency. As explained, sonic data tends to be recorded at a quite high spatial resolution along a borehole. For example, consider sonic data that are recorded at intervals of approximately 15 cm, which is a much higher resolution than that of borehole seismic. However, to calibrate a few-meter-long interval of sonic-derived velocity model using borehole seismic data can be problematic as source and receiver density is not sufficient to provide a few meters resolution.

To account for the physics-based differences between sonic data and seismic survey data, one or more of the following approaches (Approach 1 and Approach 2) may be taken.

- Approach 1: To reduce the resolution of the original sonic data to generate a velocity model with layers of ten to hundreds of meters in thickness and calibrate by inversion, the number of parameters can be reduced comparing to the original sonic-origin velocity model to thereby stabilize the inversion process.
- Approach 2: To use the original sonic as a starting point, impose regularization, which is a process that reduces the resolution of the output and, hence, stabilizes the inversion process.

The first approach (Approach 1) tends to be transparent in terms of resolution of the calibrated model; however, it does destroy the resolution of the initial log/model. With the second approach (Approach 2), the resolution of the initial log/model is partially maintained; however, it is not transparent as the impact of the imposed regularization is not trivial.

The aforementioned series approach to representing a sonic log (e.g., slowness with respect to depth) can be considered an alternative to Approach 1 and Approach 2. As an example, a series approach can be implemented in a manner that preserves the resolution of initial sonic log-derived information. Such an example can maintains the resolution of the initial sonic log where the resolution of the derived, calibrated velocity model can be updated independently.

As an example, a method can include implementing one or more Fourier techniques, for example, consider implementing a Fourier transform.

As log data can be discrete, a velocity model can also be discrete in form. Hence, the discrete Fourier transform (DFT) can be applied. The DFT can convert a finite sequence of samples of a function in one domain to another domain. For example, where original data are in a time domain, the DFT can generate a representation of the original data in a frequency domain and, for example, where original data are in a length domain, the DFT can generate a representation of the original data in a wavenumber domain. As an example, the DFT can be utilized for generating a frequency/wavenumber domain representation of an original input sequence (e.g., original data).

In digital signal processing, a function can be a quantity or signal that varies over time, such as the pressure of a sound wave, a radio signal, or daily temperature readings, sampled over a finite time interval (often defined by a window function). As explained with respect to FIG. 8, the function can be slowness (e.g., or velocity) with respect to depth, which may be measured depth along a bore. As an example, a Fourier technique may be implemented using hardware or using hardware that can execute instructions such as software instructions. A hardware implementation of a Fourier technique may be expeditious; noting that a hardware/software implementation can depend on resources (e.g., processor speed, memory, etc.).

As an example of a discrete Fourier transform (DFT) technique, consider MATLAB by MathWorks (Natick, Massachusetts), which utilizes the fast Fourier transform (FFT), a method for computing the DFT with reduced execution time. The MATLAB framework environment provides the functions fft and ifft to compute the discrete Fourier transform and its inverse, respectively. For the input sequence x and its transformed version X (the discrete-time Fourier transform at equally spaced frequencies around the unit circle), the two functions implement the relationships:

$$X(k+1) = \sum_{n=0}^{N-1} x(n+1) W_N^{kn}$$

$$\text{and } x(n+1) = \frac{1}{N} \sum_{k=0}^{N-1} X(k+1) W_N^{-kn}$$

In the foregoing equations, the series subscripts begin with 1 instead of 0 because of the MATLAB vector indexing scheme, and $$W_N = e^{-j2\pi/N}$$

The discrete Fourier transform (DFT) can be a discrete analog of the formula for the coefficients of a Fourier series:

$$x_n = \frac{1}{N} \sum_{k=0}^{N-1} X_k e^{-i2\pi kn/N}$$

For example, consider the following expression of the Fourier series in exponential form:

$$s_N(x) = \sum_{n=-N}^{N} c_n e^{-i2\pi nx/P}$$

Above, the coefficients, $c_n$, range from −N to +N (e.g., theoretically infinite) for the real-valued function s(x) that is integrable on an interval of length P, which may be referred to as the period of the Fourier series.

In an amplitude-phase form, consider the following expression for the Fourier series:

$$s_N(x) = \frac{A_0}{2} + \sum_{n=1}^{N} A_n \cos\left(\frac{2\pi}{P} nx - \varphi_n\right)$$

Above, the integer n is an index that can represent the number of cycles of the n-th harmonic in an interval P. While a particular DFT technique and implementation is described above, one or more other types of implementations may be utilized (e.g., whether custom coded, from one or more other libraries, frameworks, etc.).

As an example, a series approach can include decomposition of velocity model updates using a Fourier transform. Such an approach can solve the velocity model updates as the sum of the velocity model updates at different "wavelengths" where "wavelengths" are understood to be inverse distance metrics of a series such as a Fourier series. A series approach can keep the information present in the initial model. And, such an approach can control the resolution of the inverted model parameters. Additionally, an operator can understand how to control resolution more readily when compared to Approach 1 or Approach 2.

Figure 9:
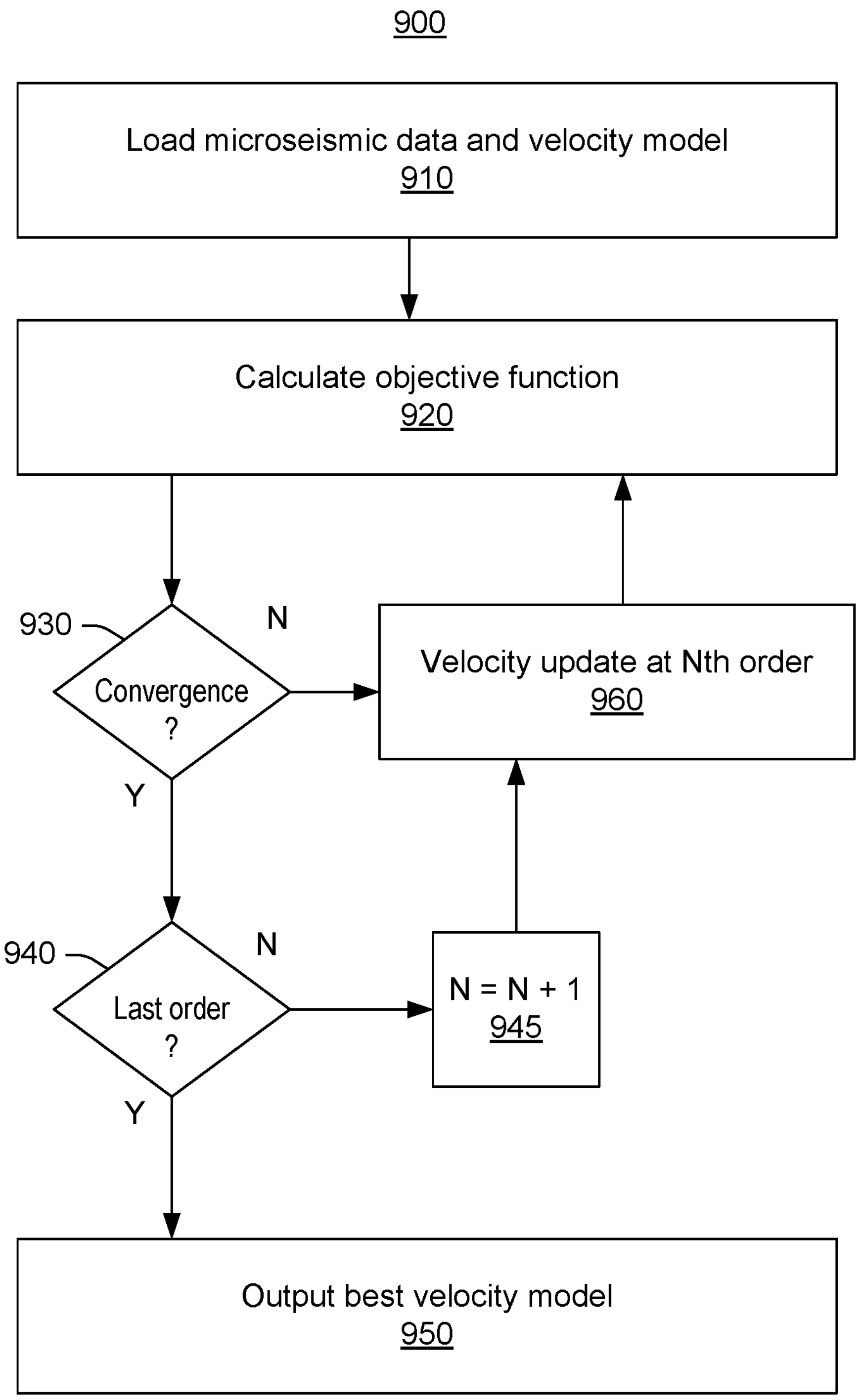
FIG. 9 illustrates an example of a method.

FIG. 9 shows an example of a method 900 that can be implemented for processing seismic data and sonic data. As shown, the method 900 include a reception block 910 for receiving microseismic data and a velocity model, a computation block 920 for computing an objective function, a decision block 930 for making a decision as to convergence, a decision block 940 for deciding whether a last order of a series (e.g., a predetermined number of orders, etc.) has been reached, an output block 950 for outputting a velocity model and an update block 960 for updating velocity with respect to a higher order. As shown, where the decision block 940 decides that another order (e.g., another wavelength) is also to be utilized, an increment block 945 can increment the order, for example, from N to N+1. In such an example, N can be an order index that can commence with 0-th order (e.g., DC) and progress to a desired number of higher orders (e.g., as may be determined via convergence, a predefined limit, etc.). Upon incrementing, the update block 960 can be utilized where the method 900 can continue at the computation block 920. As shown, where the decision block 930 decides that convergence has not been achieved for a particular order, the method 900 can continue to the update block 960 for a velocity update at the current order.

As shown, the method 900 can include one or more loops, which can result in incremental improvement in a velocity model to thereby aim to output an improved velocity model (e.g., an updated velocity model that meets one or more convergence criteria, etc.). For example, one loop can be iterative for a particular order and another loop can be iterative for a number of orders, which may be predetermined or determined dynamically.

As an example, the block 910 can be utilized for loading seismic data and an initial high-resolution sonic data-based velocity model from log measurement using a sonic tool, the block 920 can be utilized for computing a data fitting objective function, and the blocks 930 and 960 can be utilized for updating the velocity model with the fundamental components of the velocity model update where the blocks 920 and 930 can be repeated for a particular order until convergence. In such an approach, note that even if the velocity model varies along the well depths, updates (e.g., adjustment factors) to the model can be constant along depth; therefore, the velocity model can still have depth variations.

As explained, a number of orders (e.g., or modes) may be utilized and the decision block 930 in combination with the decision block 940 and the increment block 945 may provide for making decisions and progressing to a next order where appropriate. By progressing in order (e.g., mode), a velocity model may become more complex and/or more accurately represented by a series such as a Fourier series.

As explained, the block 950 can provide for outputting a velocity model, which may be a final velocity model. For example, the method 900 can output a velocity model that is generated using a 1D series representation of multiple orders (e.g., multiple modes) or a series such as, for example, a Fourier series.

As an example, a method may extend a joint inversion problem with a velocity model. For example, for microseismic monitoring, a method can leverage a series approach to jointly invert the velocity model and provide hypocenters (e.g., event locations for microseismic emissions that may stem from hydraulic fracturing operations). As an example, a velocity model may be cast as a slowness model or vice versa.

As an example, a relationship between an original velocity model, velocity model updates, and a final calibrated velocity model can be represented using equations. For example, consider Equation (1) below:

$$V_{Ci}(z) = V_{Oi}(z) + \Delta V_i(z), \tag{1}$$

where $V_C$ is the calibrated velocity model, $V_O$ is the original sonic-derived velocity model, ΔV is the velocity model update, and i is the property index of the velocity model (Vp, Vs, one or more other parameters, which may include one or more anisotropy parameters, etc.).

As indicated, Equation (1) can include a property index that can be utilized to account for one or more parameters of a velocity model that is to be calibrated. As explained, a velocity model building workflow can include providing an initial velocity model and calibrating the initial velocity model to generate a calibrated velocity model, which is expected to be more accurate. Such a workflow may be referred to as, or include, a calibrating workflow (e.g., calibration workflow). As set forth above, calibration can include accounting for various parameters, which can include one or more parameters pertaining to isotropy and/or anisotropy that may be specified spatially (e.g., with respect to depth, etc.). Some examples of anisotropy parameters include the Thomsen parameters epsilon, delta and gamma. In various instances, adjustments (e.g., updates) can pertain to isotropy and/or anisotropy (e.g., values for such parameters may be adjusted iteratively via updates).

Using Equation (1), the velocity model update can be written in the following form using the Fourier transform;

$$V_{Ci}(z) = V_{Oi}(z) + \left( \int_{-\infty}^{+\infty} \Delta v_i(k)\exp(-ikz)dz \right), \tag{2}$$

The second term of the above Equation (2) is the Fourier transform expression of the velocity model update along depth (e.g., measured depth). As an example, it can be truncated using the wavenumber k ranging from −R to +R (e.g., −R<k<+R) to control the resolution of the inversion problem. Thus, it is possible to formulate the velocity model in the following form:

$$V_{Ci}(z) = V_{DC} + \int_{-\infty}^{+\infty} v_v(k)\exp(-ikz)dz + \left( \int_{-R}^{+R} \Delta v_i(k)\exp(-ikz)dz \right), \tag{3}$$

In Equation (3), above, the calibrated velocity model ($V_c$) is expressed as a sum of original velocity model (constant term ($V_{DC}$) and depth varying term ($V_v$)) and velocity update (third term on the right side). In the foregoing example, the resolution of the original velocity can be preserved while the resolution of the calibrated velocity model is controlled using a truncation form for velocity update. Such an approach can stabilize the inversion problem while preserving spatial resolution of the original velocity model.

While the objective function measures fitting of the model to the data, an approach can include using a penalty term to constrain the solution by a priori information as desired. As an example, well log and/or other information can be used as a constraint to velocity. The following expression, Equation (4), is an example of an objective function in the case a constraint is imposed:

$$Obj(V_C) = F(Vc) + \alpha CCF(Vc, A), \tag{4}$$

where F is the fitting measure of the model to the data, CCF is cross correlation coefficient, A is a priori information along depth, and α is strength of constraint, respectively.

As an example, a series approach can be utilized for a joint velocity model and event location inversion in a microseismic monitoring survey. As explained, hydraulic fracturing can generate microseismic event that can be located using acquired seismic energy data and information about the media through which the seismic energy data travels.

A velocity model can be utilized to estimate a microseismic event 3D location (hypocenter), source parameters, and moment tensors. An initial velocity model may be built from sonic data where upscaling can be applied in order to take into account the wavelength of the seismic wave initiated at a failure locus. In such an example, the initial model can then be calibrated using perforation and/or string shot recordings prior to the microseismic event location. However, such perforation shot-based calibration tends to be applicable for events whose location (and origin time) is known. Joint inversion of velocity model and microseismic event location (JVEI hereafter) may provide for further model calibration using microseismic events.

JVEI can be utilized for global and regional seismology, with application to geothermal fields and the oil and gas industry. In relation to hydraulic fracturing monitoring, an invertibility issue can exist even where a simplified velocity model (e.g., a few layers) is assumed. In various instances, regularization is employed to increase the invertibility. Tikhonov regularization may be utilized as it can smooth control of invertibility. However, the tuning of one or more regularization terms may not be intuitive. Other approaches include truncation and truncated singular value decomposition (TSVD). TSVD analyzes a model parameter's sensitivity into data and reforms the problem into the sum of independent solutions. In microseismic, moment tensor inversion may be utilized. Global seismic tomography can present approaches where velocity is inverted by linearization of a tomography problem where a solution can be expressed as a sum of independent solutions. However, decomposition is not intuitive and the inverted velocity model's resolution is the same as the initial model, which imposes the reduction of information that the original velocity model is carrying.

As an example, a JVEI algorithm can implement an approach to velocity model decomposition while inverting for event location simultaneously. Such an approach can introduce decomposition of velocity model updates using the Fourier transform (e.g., a series representation) and solves for the velocity model updates as a sum of the velocity model updates at different wavelengths. In such an example, it is possible to maximize the information that the initial model carries and it is possible to control the resolution of the inverted model parameters.

Figure 10:
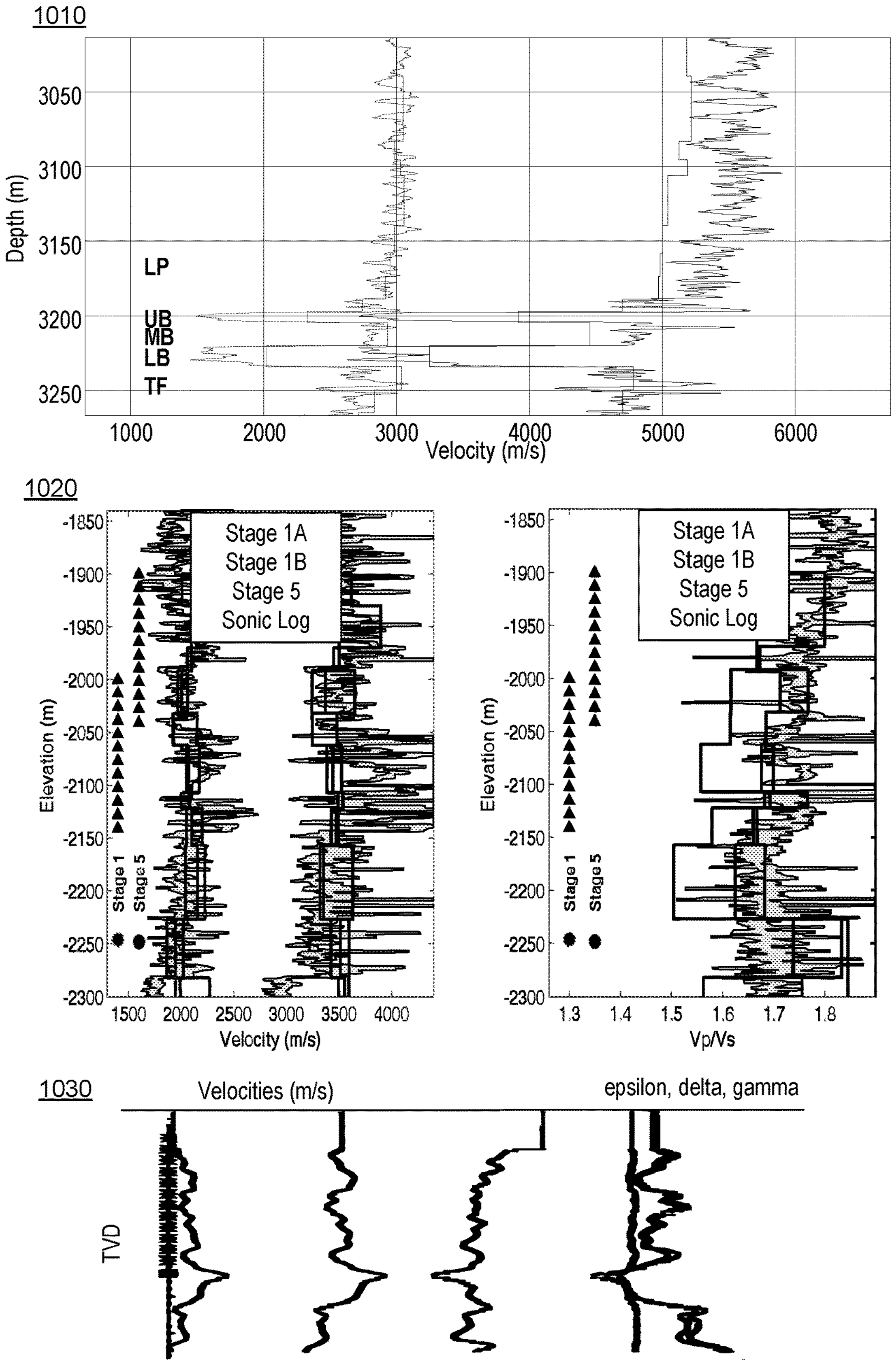
FIG. 10 illustrates examples of plots.

FIG. 10 shows various plots 1010, 1020 and 1030 of information with respect to depth pertaining to different block models. As explained, a blocked velocity model approach can be utilized that has constant Vp and Vs within each layer. Depth variation in the velocity model can then be represented by a stack of blocks as shown in the plots 1020 of FIG. 10. As shown, layer thicknesses may vary from interval to interval. Some operating procedures may call for thin layers while others may call for thicker layers where, use of thicker layers generally means fewer layers, which may impact model accuracy with respect to physical reality. An approach that utilizes extremely thin layers may be more representative of lithology and overall geology, however, with additional computational demands and possible invertibility issues.

Figure 11:
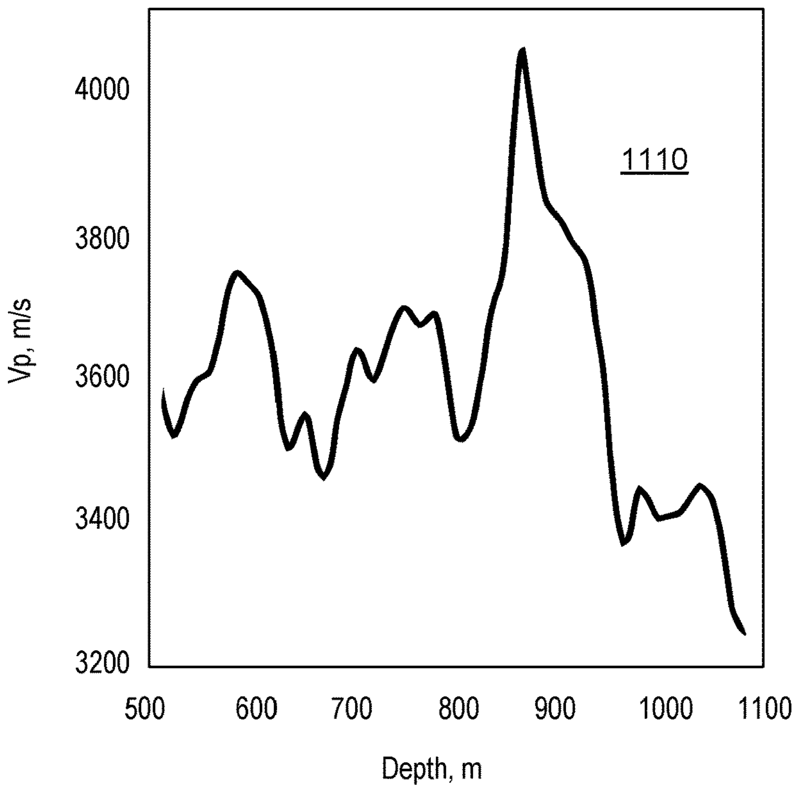
FIG. 11 illustrates examples of plots.
Figure 11:
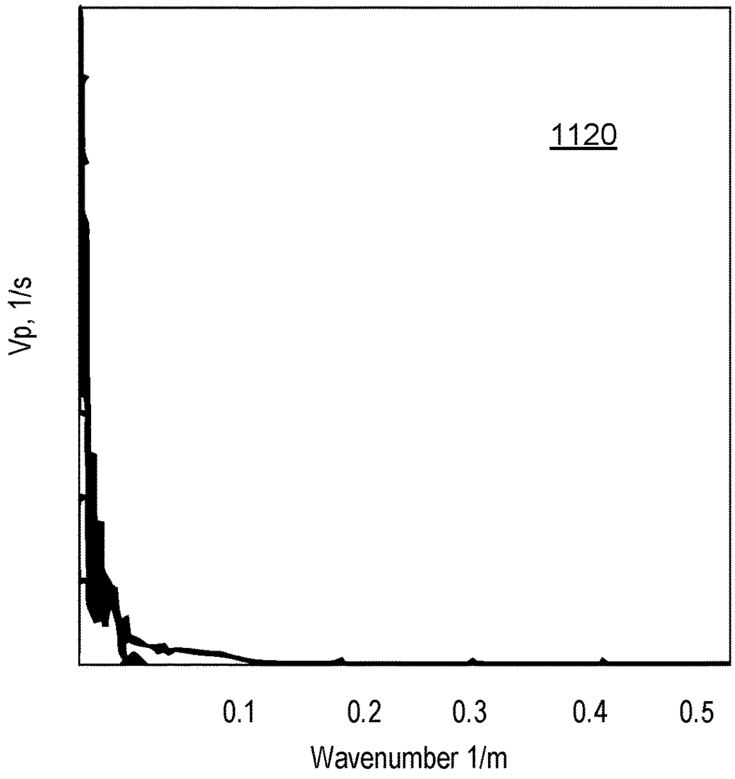
Figure 12:
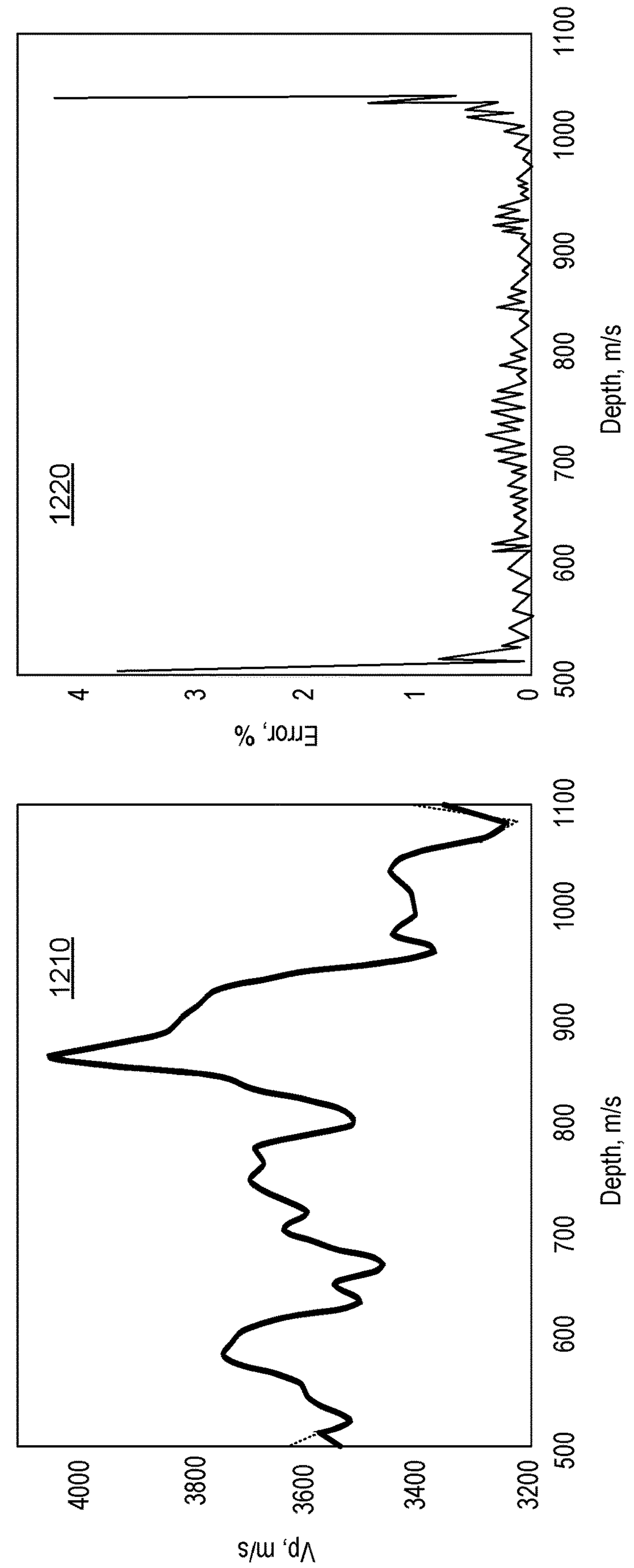
FIG. 12 illustrates examples of plots.

FIGS. 11 and 12 show example plots 1110, 1120, 1210 and 1220 for series-based velocity models. As example, a method can include decomposing velocity with respect to depth using the Fourier transform. The plots 1110 and 1120 show an example of a velocity versus depth model and its representation in a velocity versus wavenumber domain from the amplitude spectrum of the depth term estimated by Fourier transform. The plots 1210 and 1220 show the example of the velocity versus depth model and its associated error with respect to depth. Specifically, the plot 1220 shows the error between the true model and the truncated, decomposed model. As indicated, error is less than approximately 0.5 percent for most of the depths (e.g., note higher error is at edges of the interval).

In the example of FIG. 12, the plot 1210 shows the comparison of true Vp variation and truncated velocity model (components larger than 5 percent of peak amplitudes are used in the inverse Fourier transform). The plot 1220 of FIG. 12 shows the percentile error of truncated Vp velocity model in terms of depth. As mentioned, the error is less than 0.5 percent in most of depth sections, except at the edges of the interval.

FIG. 13 shows an example of a method 1300, various blocks of which may be compared to and understood with reference to the method 900 of FIG. 9. In FIG. 13, a graphic 1305 is also shown for purposes of illustrating vertical (e.g., or borehole axis) resolution and spatial resolution of various types of data. As indicated, differences can exist between well log data (e.g., borehole log data, H. Well Log) and surface seismic data (S. Seismic) where the former tends to have higher resolution than the latter. The graphic 1305 includes labels for seismic, logs, and other techniques, which are generally along a progression toward better resolution (finer resolution). In the graphic 1305, light microscopy (LM) and scanning electron microscopy (SEM) are with the finest resolution. As shown, formation imaging (FMI), as a logging technique, can achieve reasonable resolution. Lesser resolution (coarser resolution) is shown for controlled-source electromagnetics (CSEM) and grav-mag (GM).

In the example of FIG. 13, a load block 1310 provides for loading microseismic data and a velocity model, a calculate block 1320 provides for calculating an objective function and event location(s) (e.g., using Geiger's method), and a convergence block 1330 provides for deciding whether convergence is achieved with respect to one or more criteria. As shown, a "yes" branch proceeds to a decision block 1340 for deciding whether a last order has been reached, which can increment the order per an increment block 1345 or proceed to an output block 1360 for outputting the best velocity model and event location(s). The convergence block 1330 can, per a "no" branch, proceed to a velocity update block 1350 for updating the velocity at an n-th order, which can also do so via a "no" branch of the decision block 1340 followed by the increment block 1345. As shown, a loop exists that acts to update the velocity until the convergence occurs for the last order.

In the example of FIG. 13, a series of blocks 1370 illustrate an order by order update to velocity. As shown, a zero order (e.g., "DC") velocity update can be followed by one or more additional, higher order velocity updates. While the example of FIG. 13 shows first and second order updates, one or more additional orders can be utilized. A series of graphics 1380 show how each order can be summed to arrive at a series-based representation of velocity with respect to depth. As to the series in the graphics 1380, each additional order can contribute to shaping velocity updates.

The method 1300 of FIG. 13 may be implemented in the field, for example, during acquisition of seismic energy waves responsive to hydraulic fracturing operations. The method 1300, which implements a series-based approach to velocity updates can provide an improvement to a velocity model and improvement to event locations. Such improvements may improve one or more subsequent operations such as, for example, one or more additional stages of hydraulic fracturing for a common well, an adjacent well, etc. For example, where event locations are known more precisely, the locations of hydraulic fractures are generally known more precisely. Such information can be beneficial when aiming to optimize drainage from a reservoir, particularly as to where and how to fracture (e.g., number of fractures, locations of fractures, spacing of fractures, etc.).

FIG. 14 shows an example of a table 1410 that includes values that define a velocity model with respect to depth. As shown, the velocities Vp and Vs are constant with respect to depth from 1300 to 2000 meters, which can be measured depth (e.g., of a deviated borehole, etc.).

Figure 15:
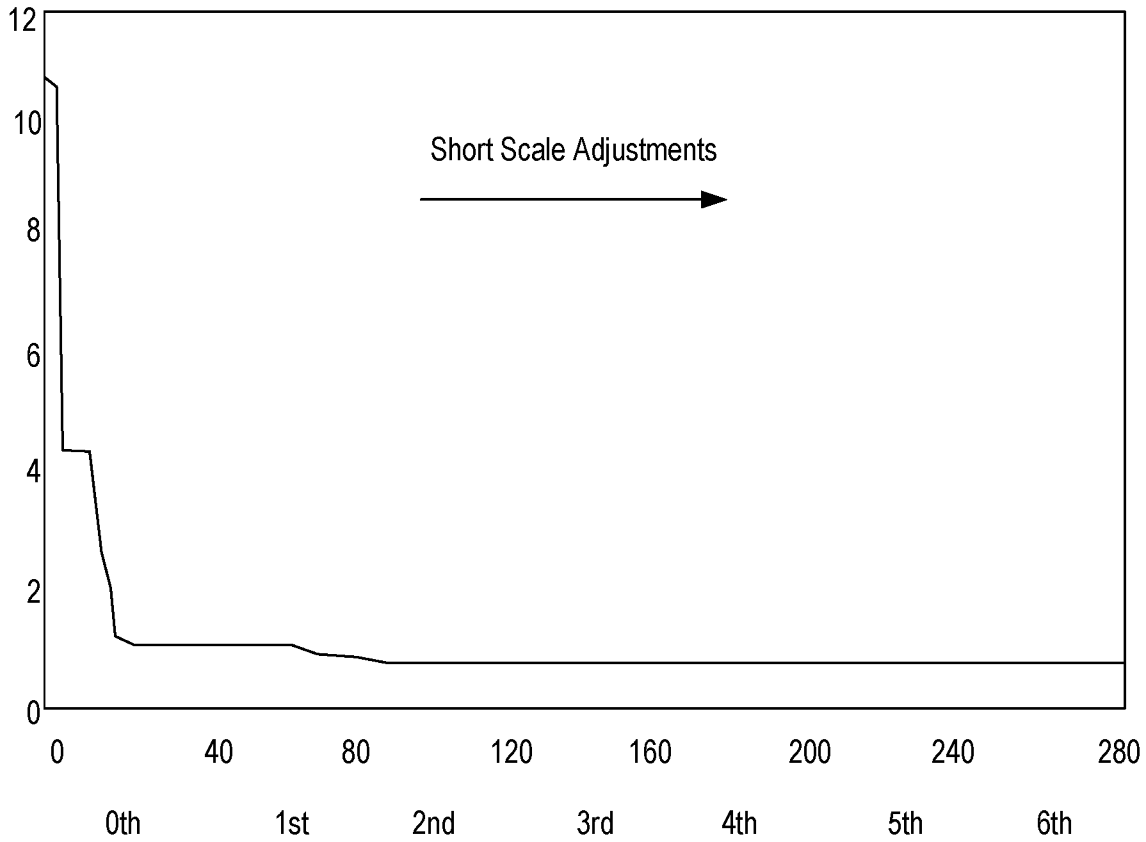
FIG. 15 illustrates an example of a plot.

FIG. 15 shows an example plot 1510 of progress of convergence in terms of an objective function. The plot 1510 shows how error is reduced as iterations progress and advance from the 0-th to the 6-th order (e.g., or mode). As indicated, the error is reduced substantially over the 0-th to 2-nd orders, which demonstrates how some amount of "constant" adjustment helps to obtain an improved model.

FIG. 16 shows example tables 1610 and 1620 for the 0-th order and the orders 0 to 6-th order, respectively. The tables 1610 and 1620 also include columns for values of Thomsen parameters epsilon (eps), delta (del) and gamma (gam). In the example of FIG. 16, the inverted velocity model of the table 1610 is the 0-th order (DC) component while the table 1620 is for a summation of the orders at each of the depths (e.g., for components from 0-th to 6-th).

As an example, an inversion can start from a constant velocity model such as the velocity model represented by the values in the table 1410 of FIG. 14 and then progress to values as in the tables 1610 and 1620 (e.g., for an appropriate number of orders, which may be predetermined, defined by error, etc.).

Figure 17:
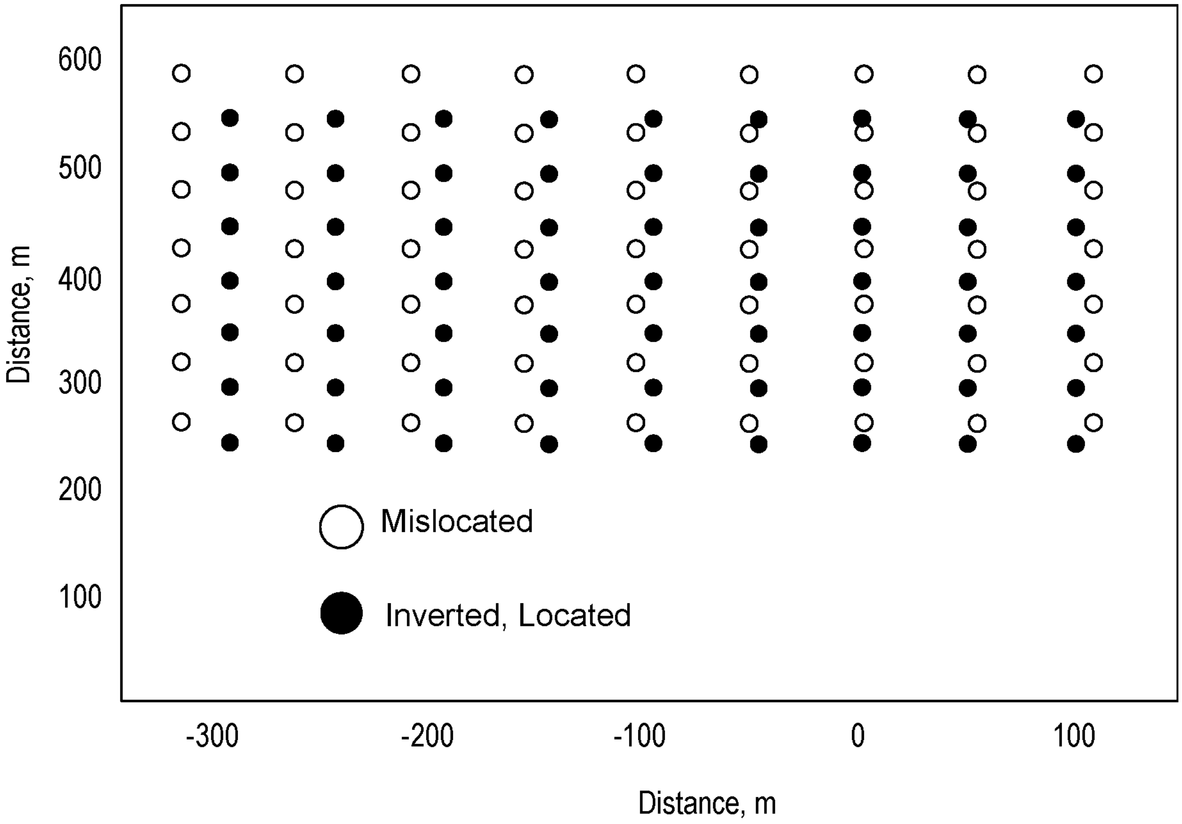
FIG. 17 illustrates an example of a plot.

FIG. 17 shows an example plot 1710 of event locations for a field in two dimensions, for example, an inline dimension in meters and a cross-line dimension in meters. In the plot 1710, initial event locations for the initial velocity model are indicated with open circles, while the final velocity model provides event locations indicated with filled circles. As to error from the initial to the final velocity model, error is approximately 40 m as to some event locations.

There can be a relatively large reduction in error of the objective function for early iterations of the inversion as the 0-th order component (constant velocity correction) is to be adjusted. Again, the plot 1510 of FIG. 15 shows the progress of the objective function convergence where higher orders can address shorter scale velocity and depth features. As to the table 1620, it shows the inverted velocity model for orders 0 to 6. While the inverted model is a relatively flat model, it does provide for substantial adjustments in event locations.

FIG. 18 shows an example table 1810 of values for velocity versus depth from 1300 to 2000 meters, which can be measured depth of a deviated borehole (e.g., consider shale and hydraulic fracturing of shale, etc.). As an example, a true model can be a constant velocity model while an initial model shows some amount of variation with respect to depth (e.g., measured depth). In such an approach, higher order terms can be utilized to adjust to thereby obtain a constant velocity model.

As an example, an inversion can start with a depth-varying velocity model. Therefore, the velocity update will be varying with depth since the true model is constant along depth (see, e.g., FIG. 20). In this example, the perturbation from the true model is the superimposition of a constant and boxcar components; therefore the velocity update will include several different wavelength components. Because the inversion estimates velocity update from long-wavelength component to short-wavelength component, there may be an expected reduction of the objective function in several components, rather than mainly in long wavelength (low order) components. To help secure convergence, a method can sweep inversion of Vp, Vs, epsilon, delta, gamma from low to higher-order components multiple times (e.g., two times, three times or more).

Figure 19:
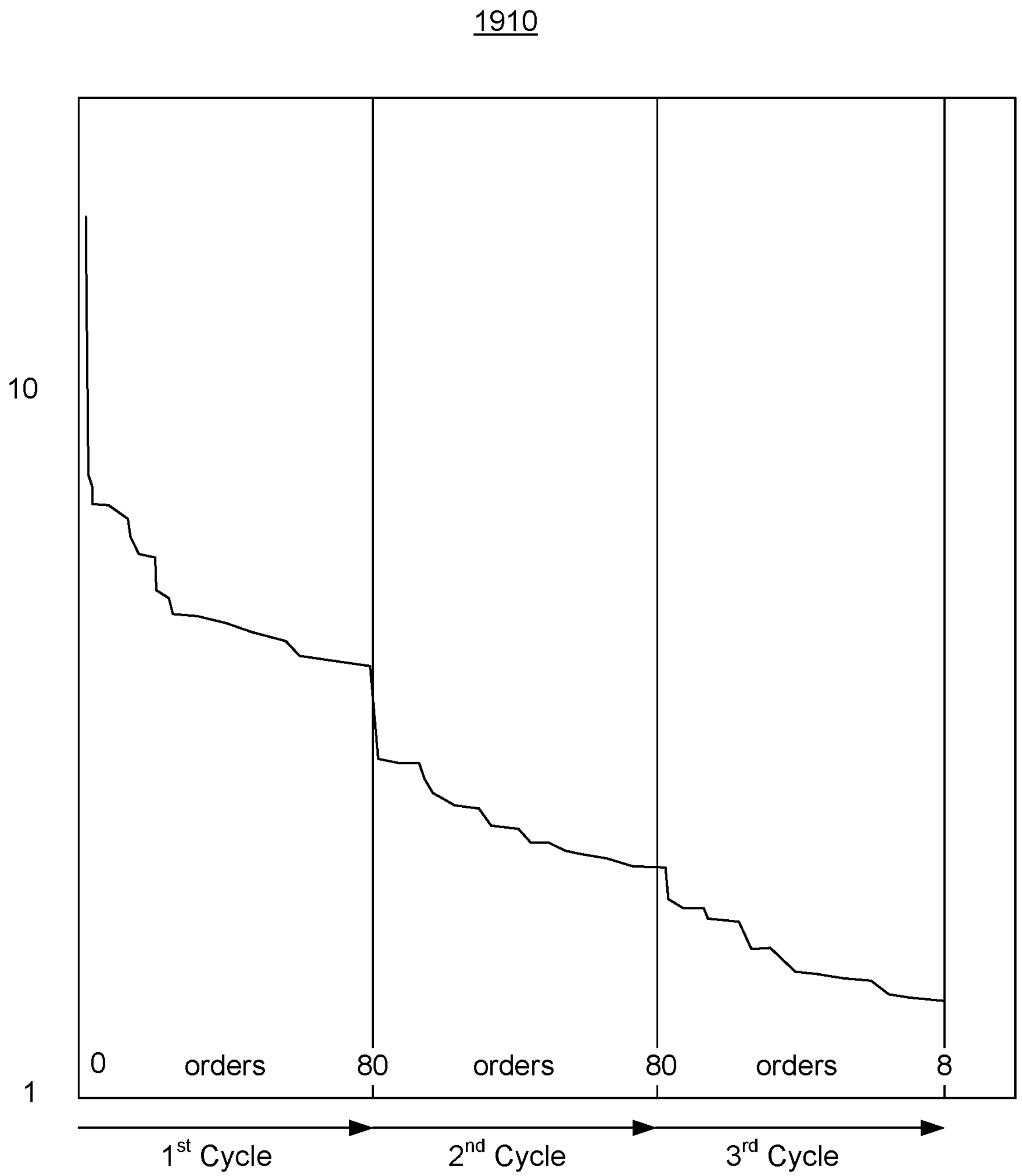
FIG. 19 illustrates an example of a plot.

FIG. 19 shows an example plot 1910 of error versus iteration and orders from 0 to 8 (e.g., 0-th to 8-th order) for three cycles. In the plot 1910, variation of the objective function is shown versus iteration where the vertical axis is in a log scale. As explained, for each cycle (e.g., inner loop), the inversion solves for velocity updates for the longest-wavelength component (0-th) to the shortest wavelength component (8-th). The inner loop is repeated per an outer loop such that three cycles occur (e.g., depending on convergence, error, etc.). The plot 1910 shows the reduction in error of the objective function. In each cycle (e.g., inner loop), the inversion solves the long-wavelength velocity update to short-wavelength component with the progress of iterations. The velocity update continues to higher orders, which may be selectable and/or automatically adjusted.

Figure 20:
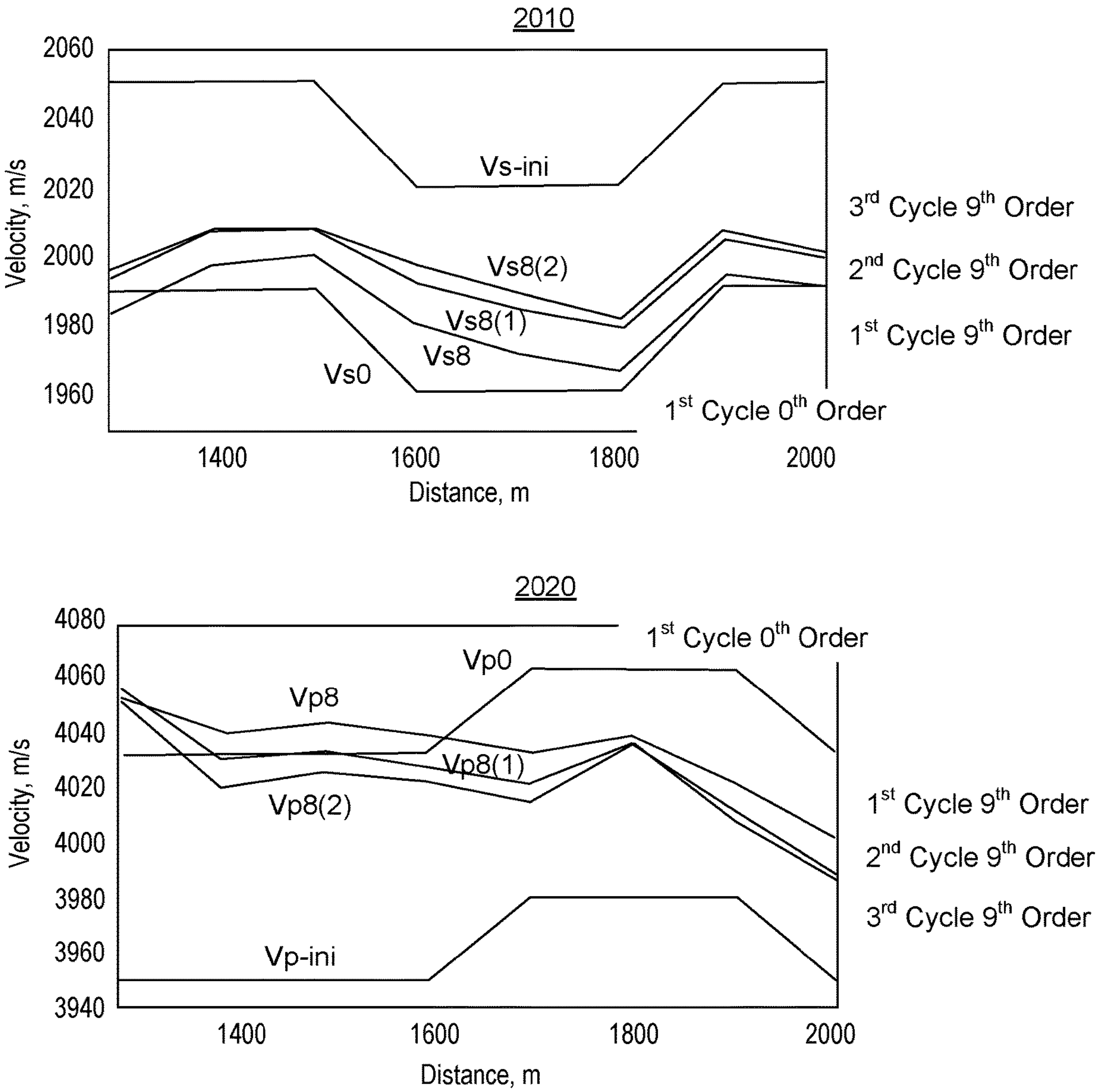
FIG. 20 illustrates examples of plots.

FIG. 20 shows example plots 2010 and 2020 for a comparison of the inverted velocity model during the iterations. With the progress of iterations, steps and constant perturbation are adjusted. The plot 2010 shows the adjustments to the model for the velocity Vs and the plot 2020 shows the adjustments to the model for the velocity Vp. As shown in FIG. 20, properties such as Vp and Vs can be indicated using a property index, noting that additional properties, specifically, Thomsen parameters epsilon, delta and gamma can be included. A velocity model may be represented in one or more forms such as, for example, in a table form where property values may be specified with respect to depth (e.g., measured depth, total vertical depth, etc.).

FIG. 21 shows an example table 2110 of a final velocity model for depths 1300 to 2000 meters for Vp and Vs along with epsilon (eps), delta (del) and gamma (gam). As explained, the model can be for a deviated borehole (e.g., horizontal, etc.), as may be utilized in an unconventional play that involves hydraulic fracturing. In such an example, microseismic monitoring can be performed to help determine locations of fractures generated via hydraulic fracturing. The locations (e.g. event locations) depend on how seismic energy travels through the play such that a more accurate velocity model can provide for more accurate locations. One or more hydraulic fracturing, drilling, completing, perforating, etc., operations may utilize locations determined in such a manner.

Figure 22:
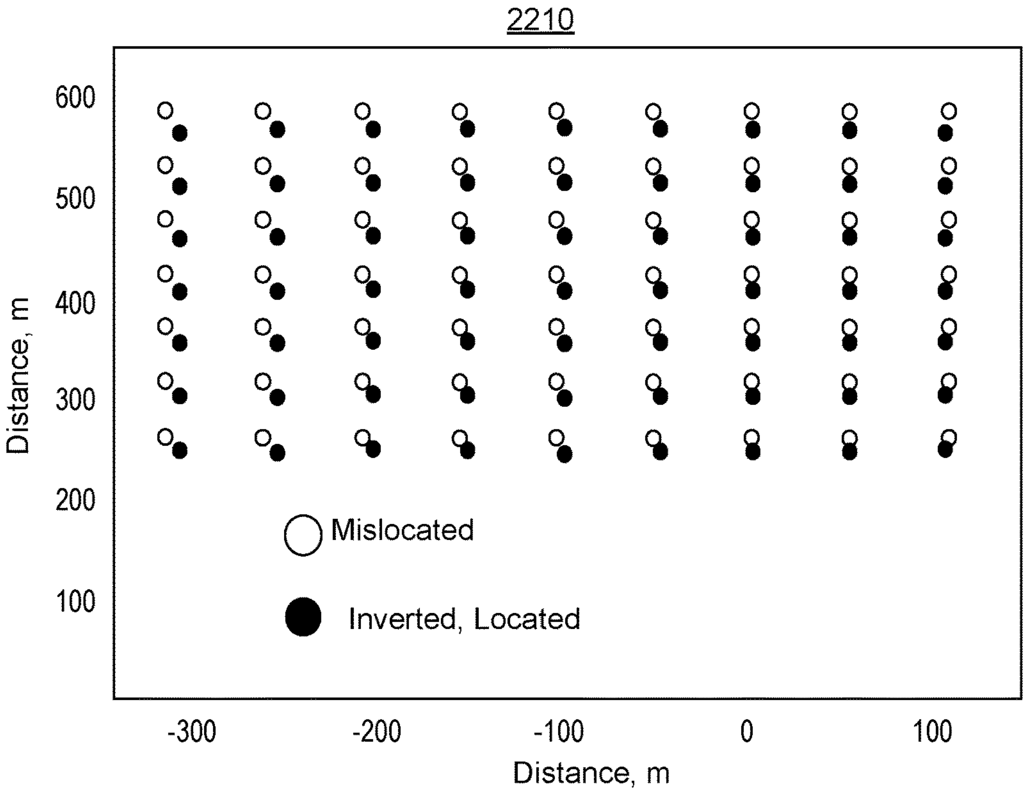
FIG. 22 illustrates examples of plots.
Figure 22:
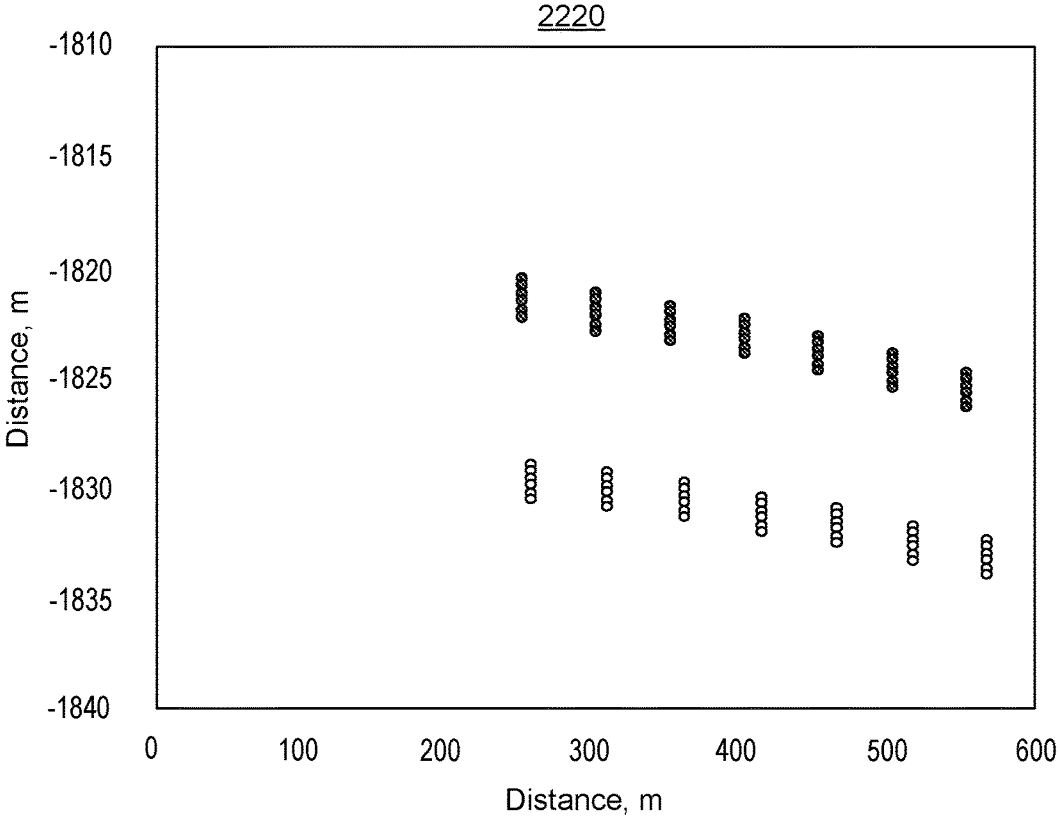

FIG. 22 shows example plots 2210 and 2220 where the plots 2210 and 2220 indicate initial velocity model based event locations with open circles and inverted, final velocity model based event locations with filled circles. The plot 2210 shows a plan view of inline and cross-line dimensions while the plot 2220 shows a cross-sectional view along a north-south dimension versus elevation. As indicated, the spatial locations of the microseismic events are improved in both the plan view of the plot 2210 and the cross-sectional view of the plot 2220.

Figure 23:
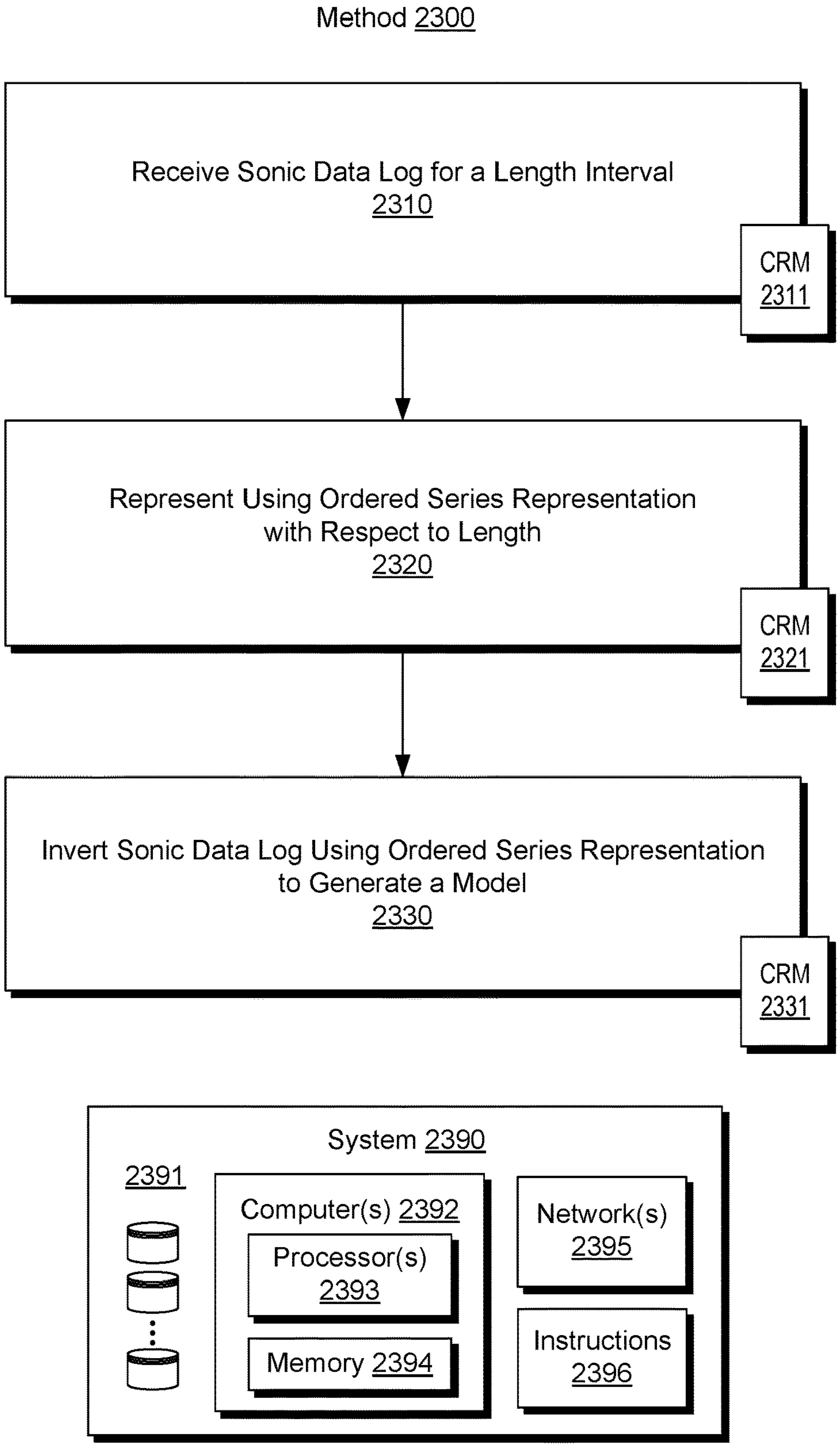
FIG. 23 illustrates an example of a method and an example of a system.

FIG. 23 shows an example of a method 2300 and an example of a system 2390. As shown, the method 2300 includes a reception block 2310 for receiving a sonic data log for a length interval of a borehole in a geologic environment as acquired via a tool disposed in the borehole; a representation block 2320 for representing the sonic data log using an ordered series representation with respect to length for at least a portion of the length interval; and an inversion block 2330 for inverting the sonic data log using the ordered series representation to generate a model of at least a portion of the geologic environment, where the model includes sonic velocity related property values.

The method 2300 is shown as including various computer-readable storage medium (CRM) blocks 2311, 2321 and 2331 that can include processor-executable instructions that can instruct a computing system, which can be a control system, to perform one or more of the actions described with respect to the method 2300.

In the example of FIG. 23, the system 2390 includes one or more information storage devices 2391, one or more computers 2392, one or more networks 2395 and instructions 2396. As to the one or more computers 2392, each computer may include one or more processors (e.g., or processing cores) 2393 and memory 2394 for storing the instructions 2396, for example, executable by at least one of the one or more processors 2393 (see, e.g., the blocks 2311, 2321 and 2331). As an example, a computer may include one or more network interfaces (e.g., wired or wireless), one or more graphics cards, a display interface (e.g., wired or wireless), etc.

As an example, the method 2300 may be a workflow that can be implemented using one or more frameworks that may be within a framework environment. As an example, the system 2390 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

As an example, a method may be implemented in part using computer-readable media (CRM), for example, as a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

As an example, a method can include receiving a sonic data log for a length interval of a borehole in a geologic environment as acquired via a tool disposed in the borehole; representing the sonic data log using an ordered series representation with respect to length for at least a portion of the length interval; and inverting the sonic data log using the ordered series representation to generate a model of at least a portion of the geologic environment, where the model includes sonic velocity related property values. For example, the model can be a velocity model of at least a portion of the geologic environment. As explained, a method can include joint inversion where, for example, event locations of microseismic events from in-hole shots (e.g., seismic energy equipment, perforating equipment, etc.) and/or from hydraulic fracturing may be determined (e.g., sequentially and/or simultaneously).

As an example, an ordered series representation can include a Fourier series. As an example, a method can include implementing one or more Fourier techniques (e.g., DFT, etc.).

As an example, an ordered series representation can include a zero order component (e.g., a DC component, etc.). For example, consider an ordered series representation that includes a zero order component and at least one order component greater than the zero order component.

As an example, a borehole can be or include a deviated borehole. For example, consider a deviated borehole in an unconventional play. An unconventional play may be for oil and gas resources whose porosity, permeability, fluid trapping mechanism, or other characteristics differ from conventional sandstone and carbonate reservoirs. For example, consider one or more of coalbed methane, gas hydrates, shale gas, fractured reservoirs, and tight gas sands. As an example, a geologic environment can include an unconventional reservoir, which, for example, may include shale.

As an example, a length interval can be a measured depth interval, which may be greater than a corresponding true vertical depth interval. For example, consider a horizontal well as may be drilled using directional drilling, which can include horizontal drilling (e.g., a subset of directional drilling where departure of a bore from vertical exceeds about 80 degrees). As an example, for some horizontal wells, after reaching true 90 degrees horizontal, the bore may turn upward. In such cases, the angle past 90 degrees can be continued, as in 95 degrees, rather than reporting it as deviation from vertical, which would then be 85 degrees. The aim of a horizontal well may be to penetrate a greater length of a lateral reservoir, which can improve production over a vertical well.

As an example, a method can include inverting that includes progressing successively from a lower order to a higher order of an ordered series representation to reduce error represented by an objection function. In such an example, a progression from the lower order to the higher order can define a cycle. In such an example, a method may include performing more than one cycle, for example, utilizing a result from a prior cycle for an initial cycle condition (e.g., output of one cycle is utilized as an initial condition for a next cycle).

As an example, a method can include defining blocks, where inverting may be performed on a block-by-block basis.

As an example, a sonic data log can include compressional wave data and shear wave data. In such an example, the sonic data log may further include Stoneley wave data, mud wave data or Stoneley wave data and mud wave data.

As an example, a method can include receiving data from one or more members of a group that includes porosity data, gamma ray data, caliper data and bulk density data. In such an example, the data may be acquired via a tool (e.g., a downhole tool that can be moved at least axially along a length of a borehole).

As an example, a method can include generating sonic velocity related property values, which may include, for example, velocity units (e.g., unit length per unit time) or slowness units (e.g., unit time per unit length).

As an example, a method can include receiving microseismic monitoring data and jointly inverting such data along with sonic data to generate microseismic event locations. In such an example, the microseismic monitoring data may include surface and/or downhole data. As an example, a method can include one or more types of joint inversion, which may include sequential and/or simultaneous joint inversion(s).

As an example, a system can include a processor; memory accessible to the processor; processor-executable instructions stored in the memory and executable by the processor to instruct the system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, where the model includes sonic velocity related property values.

As an example, one or more computer-readable storage media can include computer-executable instructions executable to instruct a computing system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, where the model includes sonic velocity related property values.

As an example, a computer program product can include executable instructions that can be executed to cause a system to operate according to one or more methods. For example, consider a computer program product that can include instructions executable to instruct a computing system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, where the model includes sonic velocity related property values.

Figure 24:
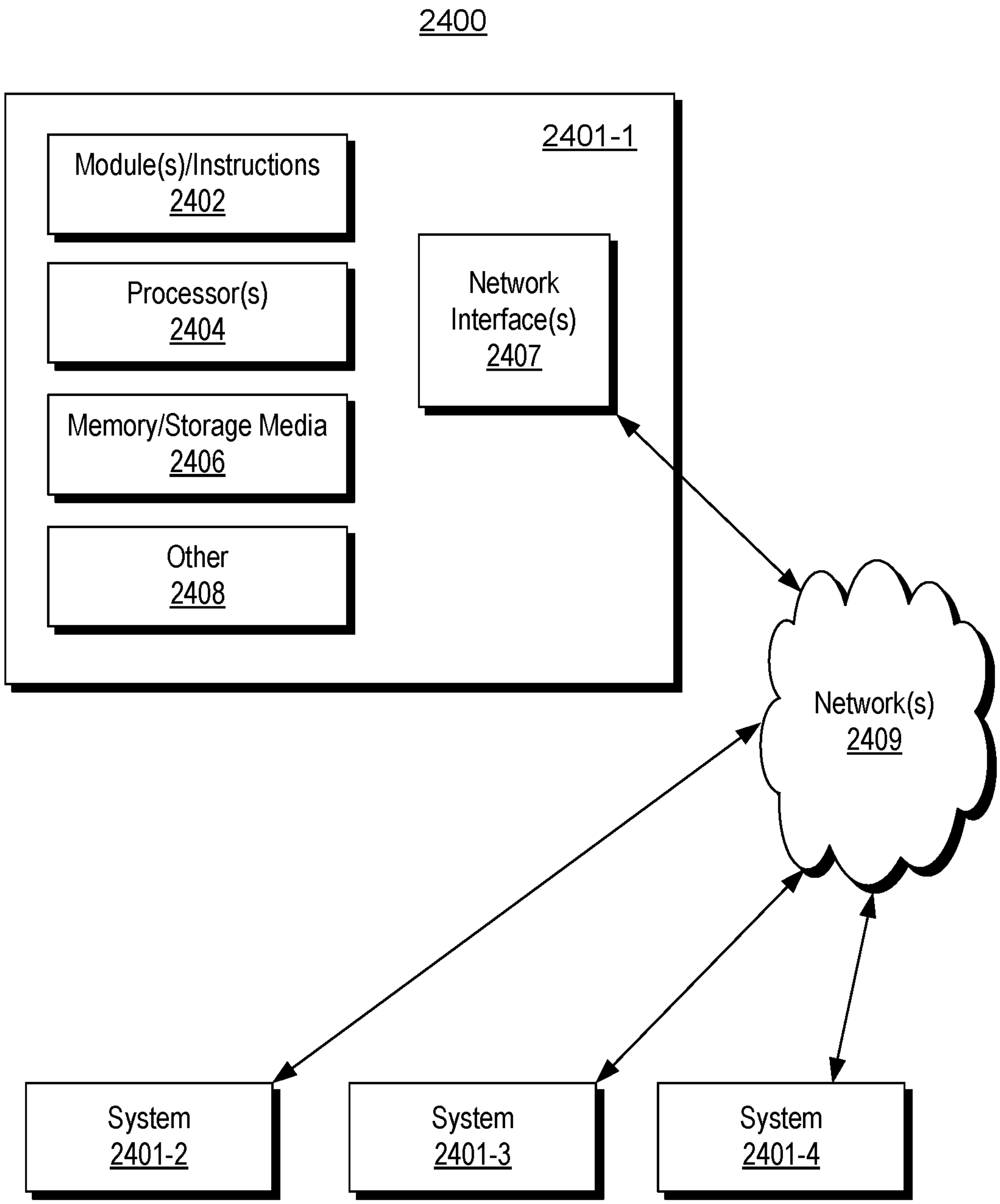
FIG. 24 illustrates an example of a computing system.

In some embodiments, a method or methods may be executed by a computing system. FIG. 24 shows an example of a system 2400 that can include one or more computing systems 2401-1, 2401-2, 2401-3 and 2401-4, which may be operatively coupled via one or more networks 2409, which may include wired and/or wireless networks.

As an example, a system can include an individual computer system or an arrangement of distributed computer systems. In the example of FIG. 24, the computer system 2401-1 can include one or more modules 2402, which may be or include processor-executable instructions, for example, executable to perform various tasks (e.g., receiving information, requesting information, processing information, simulation, outputting information, etc.).

As an example, a module may be executed independently, or in coordination with, one or more processors 2404, which is (or are) operatively coupled to one or more storage media 2406 (e.g., via wire, wirelessly, etc.). As an example, one or more of the one or more processors 2404 can be operatively coupled to at least one of one or more network interfaces 2407. In such an example, the computer system 2401-1 can transmit and/or receive information, for example, via the one or more networks 2409 (e.g., consider one or more of the Internet, a private network, a cellular network, a satellite network, etc.). As shown, one or more other components 2408 can be included, which can provide for storage, computations, networking, etc.

As an example, the computer system 2401-1 may receive from and/or transmit information to one or more other devices, which may be or include, for example, one or more of the computer systems 2401-2, etc. A device may be located in a physical location that differs from that of the computer system 2401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 25:
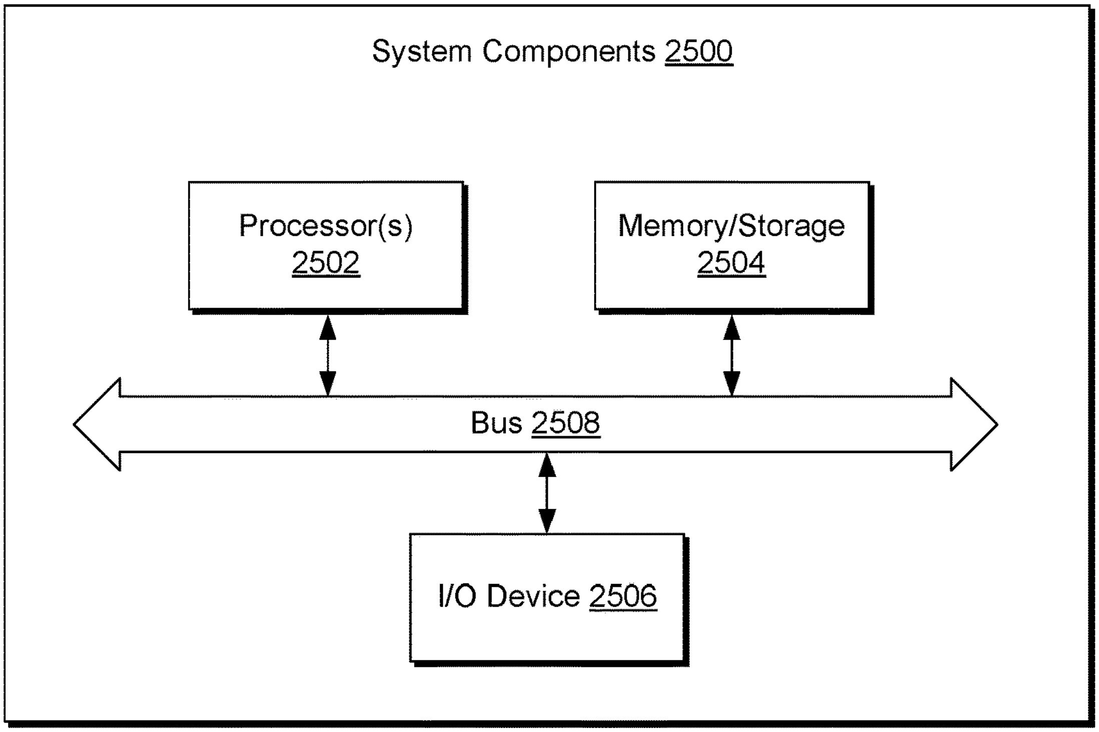
FIG. 25 illustrates example components of a system and a networked system.
Figure 25:
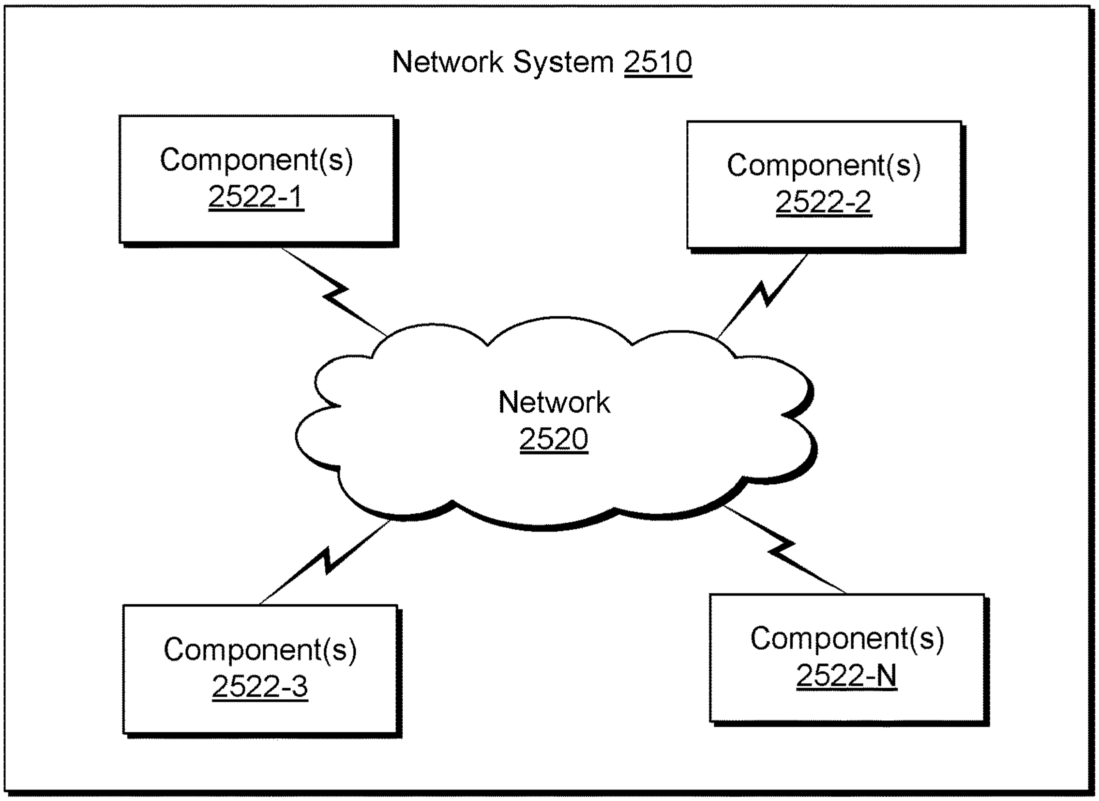

FIG. 25 shows components of a computing system 2500 and a networked system 2510 with a network 2520. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Exemplary embodiments include: A method comprising: receiving a sonic data log for a length interval of a borehole in a geologic environment as acquired via a tool disposed in the borehole; representing the sonic data log using an ordered series representation with respect to length for at least a portion of the length interval; and inverting the sonic data log using the ordered series representation to generate a model of at least a portion of the geologic environment, wherein the model includes sonic velocity related property values, wherein the ordered series representation includes a Fourier series, wherein the ordered series representation includes a zero order component and wherein the ordered series representation includes at least one order component greater than the zero order component, wherein the borehole includes a deviated borehole, wherein the geologic environment includes an unconventional reservoir, optionally wherein the unconventional reservoir includes shale, wherein the length interval includes a measured depth interval, optionally wherein the measured depth interval is greater than a corresponding true vertical depth interval, wherein the inverting includes progressing successively from a lower order to a higher order of the ordered series representation to reduce error represented by an objection function, wherein a progression from the lower order to the higher order defines a cycle and comprising performing more than one cycle utilizing a result from a prior cycle for an initial cycle condition, with some embodiments comprising defining blocks, wherein the inverting is performed on a block-by-block basis, wherein the sonic data log includes compressional wave data and shear wave data, wherein the sonic data log further includes Stoneley wave data, mud wave data or Stoneley wave data and mud wave data, with some embodiments further comprising receiving data from one or more members of a group consisting of porosity data, gamma ray data, caliper data and bulk density data, and wherein the data are acquired via the tool, and some embodiments comprising receiving microseismic monitoring data and jointly inverting to generate microseismic event locations.

Exemplary embodiments include: A system comprising: a processor; memory accessible to the processor; processor-executable instructions stored in the memory and executable by the processor to instruct the system to: receive a sonic data log for a length interval of a borehole in a geologic environment as acquired via a tool disposed in the borehole; represent the sonic data log using an ordered series representation with respect to length for at least a portion of the length interval; and invert the sonic data log using the ordered series representation to generate a model of at least a portion of the geologic environment, wherein the model includes sonic velocity related property values.

Exemplary embodiments include: A computer program product that includes computer-executable instructions to instruct a computing system to perform a method according to any of described herein.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

performing drilling operations using a bottomhole assembly in a borehole in a geologic environment;

emitting a sonic wave from a sonic tool in the bottomhole assembly;

receiving sonic data, based on the sonic wave, as a sonic data log for a length interval of the borehole;

generating an ordered series representation of the sonic data log, wherein the ordered series representation is of a slowness domain with respect to a depth domain for at least a portion of the length interval; and generating a 1-dimensional (1D) velocity model from the ordered series representation, wherein generating the 1D velocity model includes inverting the sonic data log using the ordered series representation to generate a model of at least a portion of the geologic environment, wherein the model includes sonic velocity related property values, wherein inverting the sonic data log includes progressing successively from a lower order to a higher order of the ordered series representation to reduce error represented by an objection function.

2. The method of claim 1, wherein the ordered series representation includes a Fourier series.

3. The method of claim 1, wherein the ordered series representation includes a zero order component.

4. The method of claim 3, wherein the ordered series representation includes at least one order component greater than the zero order component.

5. The method of claim 1, wherein the borehole includes a deviated borehole.

6. The method of claim 1, wherein the geologic environment includes an unconventional reservoir.

7. The method of claim 6, wherein the unconventional reservoir includes shale.

8. The method of claim 1, wherein the length interval includes a measured depth interval.

9. The method of claim 8, wherein the measured depth interval is greater than a corresponding true vertical depth interval.

10. The method of claim 1, comprising defining blocks, wherein the inverting is performed on a block-by-block basis.

11. The method of claim 1, wherein the sonic data log includes compressional wave data and shear wave data.

12. The method of claim 11, wherein the sonic data log further includes Stoneley wave data, mud wave data or Stoneley wave data, and mud wave data.

13. The method of claim 1, further comprising receiving data from one or more members of a group consisting of porosity data, gamma ray data, caliper data, and bulk density data, and wherein the data are acquired via the sonic tool.

14. The method of claim 1, wherein the sonic velocity related property values include velocity units or slowness units.

15. The method of claim 1, comprising receiving microseismic monitoring data and jointly inverting to generate microseismic event locations.

16. A system comprising:

a processor;

memory accessible to the processor; and processor-executable instructions stored in the memory and executable by the processor to instruct the system to:

while performing drilling operations using a bottomhole assembly in a borehole in a geologic environment, emit a sonic wave from a sonic tool in the bottomhole assembly;

receive sonic data, based on the sonic wave, as a sonic data log for a length interval of the borehole;

generate an ordered series representation of the sonic data log, wherein the ordered series representation is of a slowness domain with respect to a depth domain for at least a portion of the length interval; and generate a 1-dimensional (1D) velocity model from the ordered series representation, wherein generating the 1D velocity model includes inverting the sonic data log using the ordered series representation to generate a model of at least a portion of the geologic environment, wherein the model includes sonic velocity related property values, wherein inverting the sonic data log includes progressing successively from a lower order to a higher order of the ordered series representation to reduce error represented by an objection function.

17. One or more computer-readable storage media comprising computer-executable instructions executable to instruct a computing system to:

while performing drilling operations using a bottomhole assembly in a borehole in a geologic environment, emit a sonic wave from a sonic tool in the bottomhole assembly;

receive sonic data, based on the sonic wave, as a sonic data log for a length interval of the borehole;

generate an ordered series representation of the sonic data log, wherein the ordered series representation is of a slowness domain with respect to a depth domain for at least a portion of the length interval; and generate a 1-dimensional (1D) velocity model from the ordered series representation, wherein generating the 1D velocity model includes inverting the sonic data log using the ordered series representation to generate a model of at least a portion of the geologic environment, wherein the model includes sonic velocity related property values, wherein inverting the sonic data log includes progressing successively from a lower order to a higher order of the ordered series representation to reduce error represented by an objection function, wherein a progression from the lower order to the higher order defines a cycle, and wherein the cycle utilizes a result from a prior cycle for an initial cycle condition.

* * * * *